United States Patent
Iwasaki

(10) Patent No.: US 12,327,535 B2
(45) Date of Patent: Jun. 10, 2025

(54) DISPLAY APPARATUS, DISPLAY METHOD, AND PROGRAM

(71) Applicant: SONY GROUP CORPORATION, Tokyo (JP)

(72) Inventor: Masanori Iwasaki, Kanagawa (JP)

(73) Assignee: Sony Group Corporation, Tokyo (JP)

(*) Notice: Subject to any disclaimer, the term of this patent is extended or adjusted under 35 U.S.C. 154(b) by 108 days.

(21) Appl. No.: 18/004,167

(22) PCT Filed: Jul. 7, 2021

(86) PCT No.: PCT/JP2021/025638
§ 371 (c)(1),
(2) Date: Jan. 3, 2023

(87) PCT Pub. No.: WO2022/014441
PCT Pub. Date: Jan. 20, 2022

(65) Prior Publication Data
US 2023/0298542 A1  Sep. 21, 2023

(30) Foreign Application Priority Data
Jul. 16, 2020 (JP) .................................. 2020-122144

(51) Int. Cl.
*G09G 5/38* (2006.01)
*G06F 3/04817* (2022.01)

(52) U.S. Cl.
CPC ............ *G09G 5/38* (2013.01); *G06F 3/04817* (2013.01); *G09G 2320/0626* (2013.01); *G09G 2340/0478* (2013.01)

(58) Field of Classification Search
CPC ............. G09G 5/38; G09G 2320/0626; G09G 2340/0478; G09G 2340/0464;
(Continued)

(56) References Cited

U.S. PATENT DOCUMENTS

2004/0239763 A1* 12/2004 Notea .................... H04N 23/62
348/E5.022
2007/0247439 A1* 10/2007 Daniel .................. G06F 1/1694
345/173
(Continued)

FOREIGN PATENT DOCUMENTS

JP 2002-344915 11/2002
JP 2005-091449 4/2005
(Continued)

OTHER PUBLICATIONS

Niioka Shinya Display Control Device and Display Control Method Sep. 7, 2017 NES Display Solution Ltd. JP 2017156602 A paragraphs [0002], [0005], [001 l]-[0049], fig. 1-21 English.*
(Continued)

*Primary Examiner* — Prabodh M Dharia
(74) *Attorney, Agent, or Firm* — SHERIDAN ROSS P.C.

(57) ABSTRACT

A display apparatus according to an embodiment of the present technology includes a display section, an acquisition section, and an image generator. The display section includes a display that has a cylinder-like body and on which an output image is displayed. The acquisition section acquires pieces of direction information that respectively indicate directions of respective users of a plurality of users as viewed from the display. The image generator generates the output image on the basis of the pieces of direction information such that pieces of information that respectively correspond to the users of the plurality of users are presented in the respective directions of the users of the plurality of users.

16 Claims, 15 Drawing Sheets

(58) Field of Classification Search
CPC ............ G06F 3/04817; G06F 3/04847; G06F 3/1423; G06F 1/1605; H04N 5/74; G06T 11/80; G06T 11/20; G09F 9/00; G03B 21/00
USPC .................... 345/173, 629, 659; 348/E5.022
See application file for complete search history.

(56) References Cited

U.S. PATENT DOCUMENTS

| | | | |
|---|---|---|---|
| 2009/0002586 A1 | 1/2009 | Kimura | |
| 2009/0323315 A1* | 12/2009 | Tuite .................. | G09F 13/04 362/98 |
| 2012/0278031 A1 | 11/2012 | Oda et al. | |
| 2015/0058765 A1 | 2/2015 | Park et al. | |
| 2015/0070475 A1* | 3/2015 | Kim .................... | H04N 13/376 348/51 |
| 2016/0140740 A1* | 5/2016 | Natori ................. | G06T 11/60 345/629 |
| 2019/0095164 A1* | 3/2019 | Yamaura ............. | G10L 15/26 |

FOREIGN PATENT DOCUMENTS

| | | |
|---|---|---|
| JP | 2006-308745 | 11/2006 |
| JP | 2008-287026 | 11/2008 |
| JP | 2012-234230 | 11/2012 |
| JP | 2013-164431 | 8/2013 |
| JP | 2015-019162 | 1/2015 |
| JP | 2016-099731 | 5/2016 |
| JP | 2017-156602 | 9/2017 |
| JP | 2019-061557 | 4/2019 |
| WO | WO 2019/111465 | 6/2019 |

OTHER PUBLICATIONS

Niioka Shinya Display Control Device and Display Control Method Sep. 7, 2017 NES Display Solution Ltd. JP 2017156602 A paragraphs [0002], [0005], [0011]-[0049], fig. 1-21 Japanese.*
Daiku Yasuhiro Liquid Crystal Display Device Nov 9, 2006 Casio Computer Co Ltd JP2006308745 (A) paragraphs [0013]-[0031], fig. 1, 2 English.*
Daiku Yasuhiro Liquid Crystal Display Device Nov 9, 2006 Casio Computer Co Ltd JP2006308745 (A) paragraphs [0013]-[0031], fig. 1, 2 Japanese.*
International Search Report and Written Opinion prepared by the Japan Patent Office on Sep. 15, 2021, for International Application No. PCT/JP2021/025638, 3 pgs.

* cited by examiner

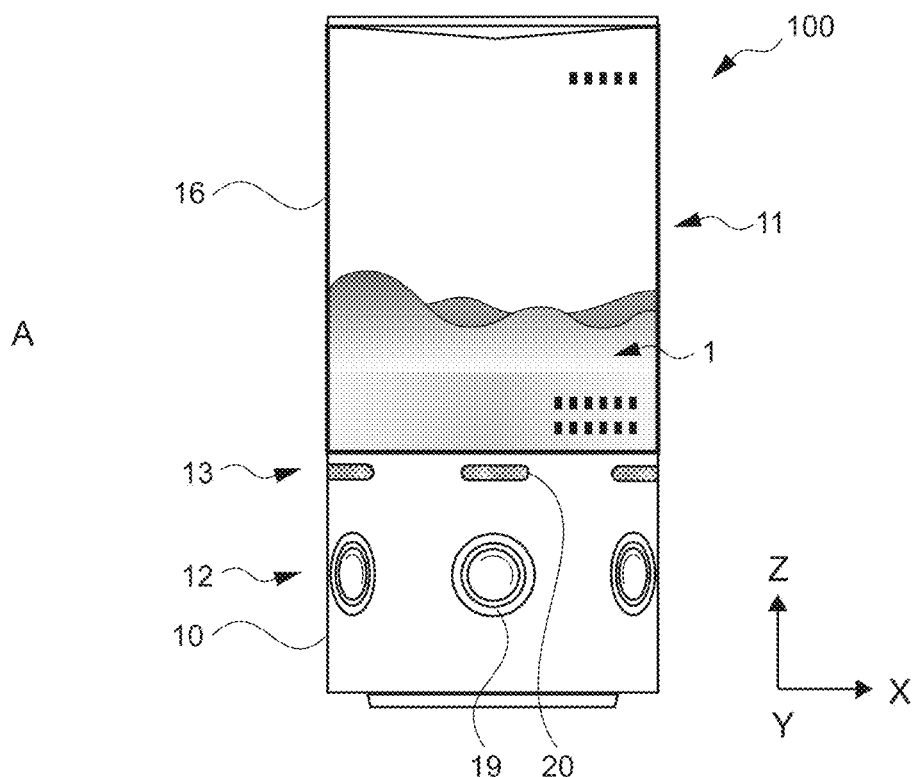
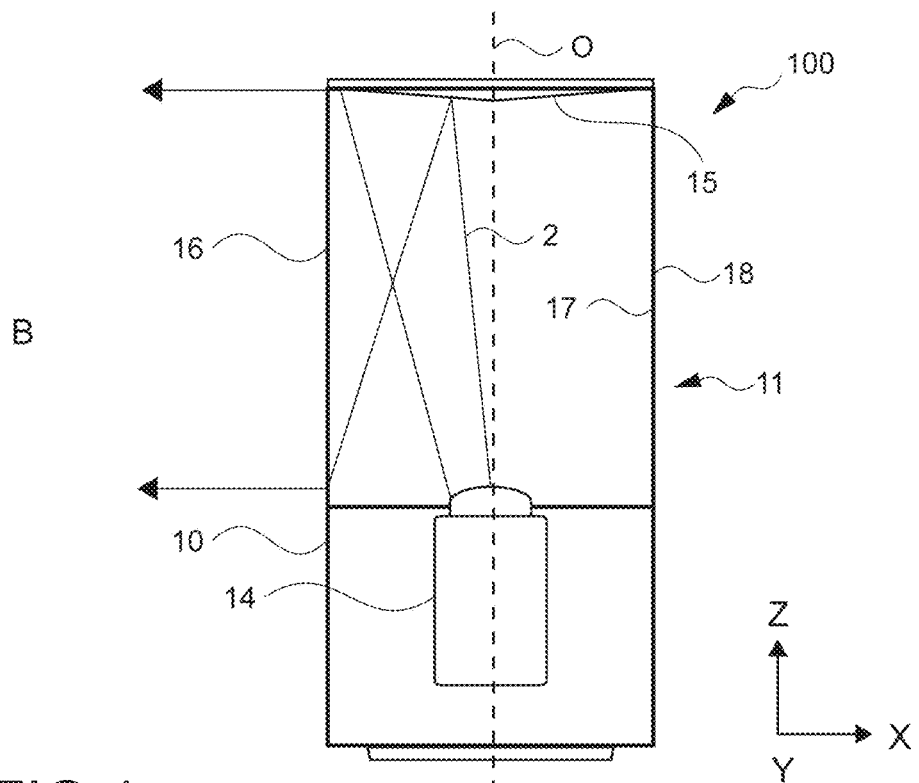
FIG.1

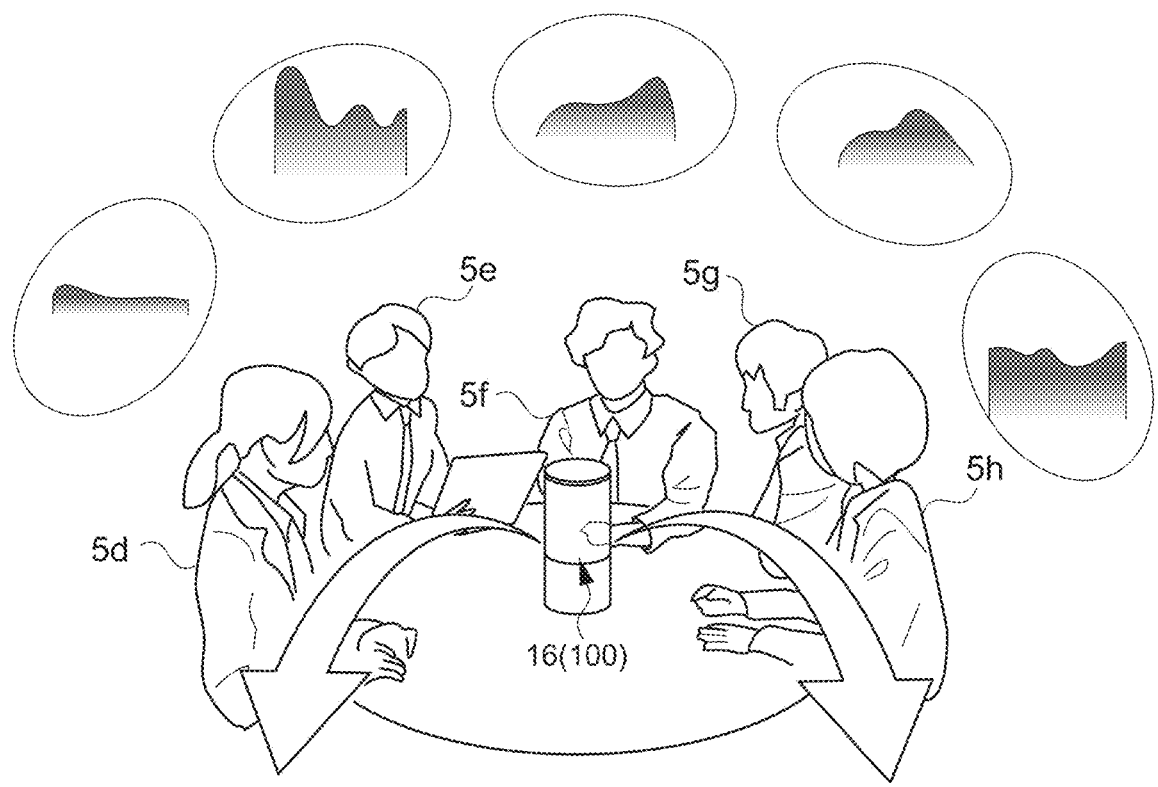
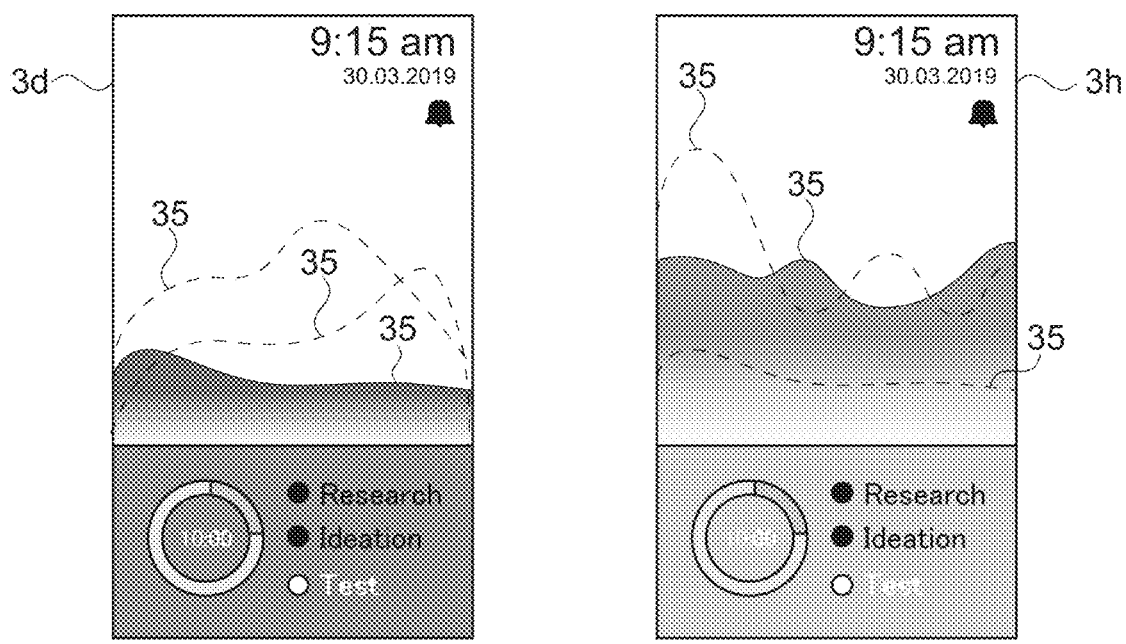
FIG.5

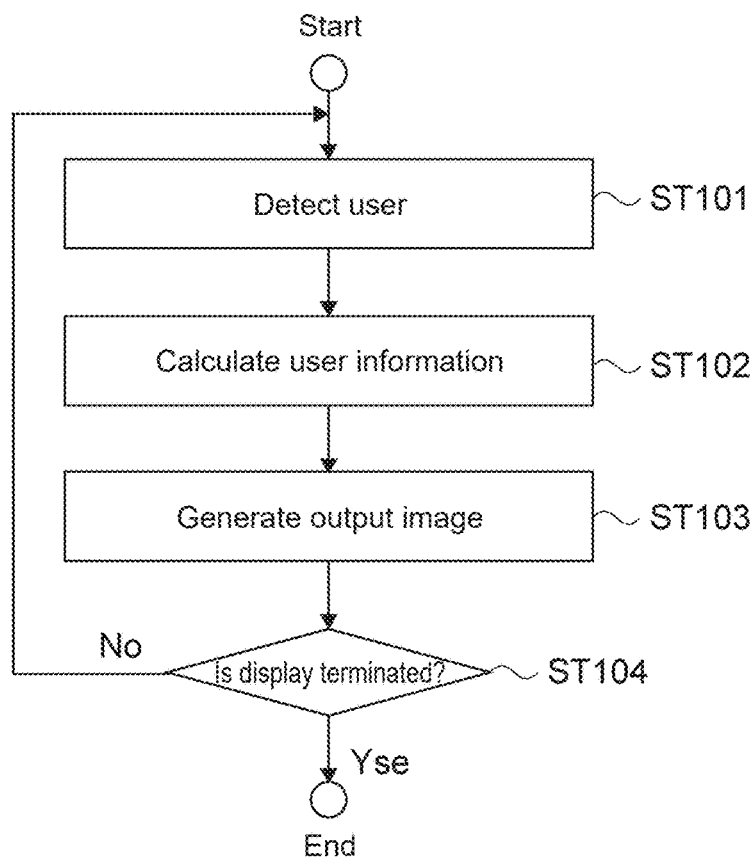
FIG.9
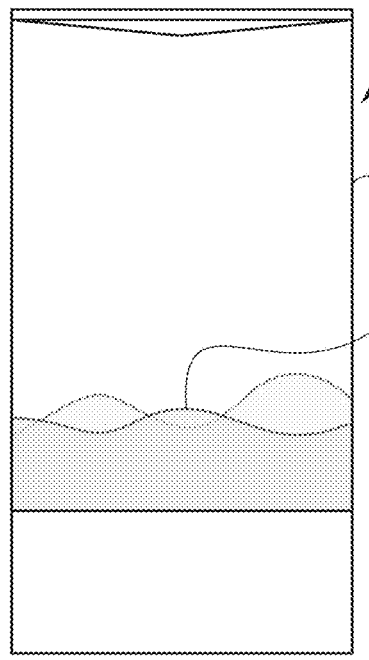
positive / normal
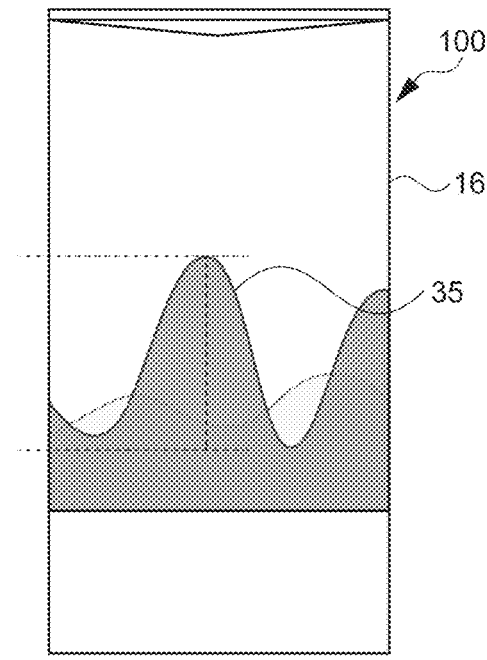
negative
FIG.10

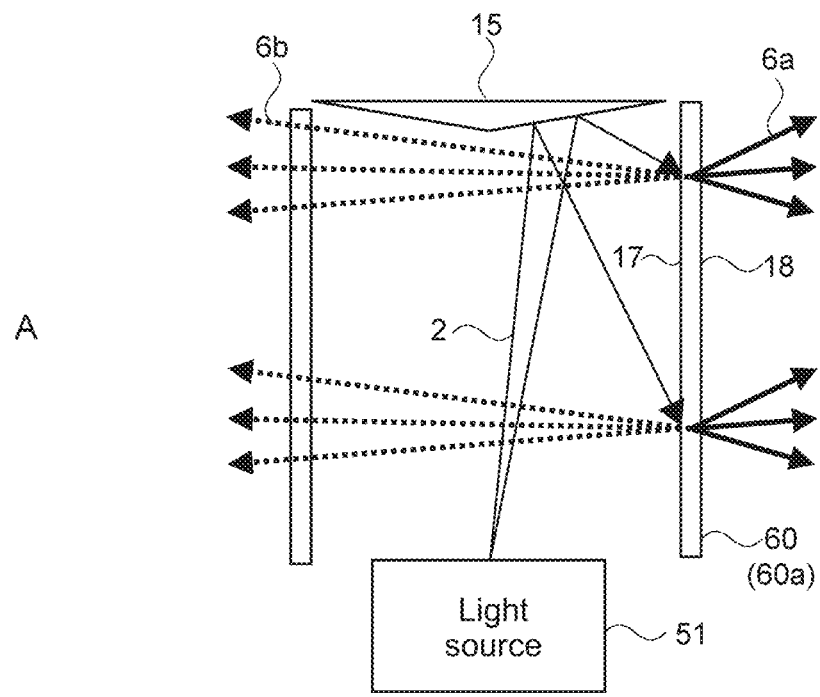
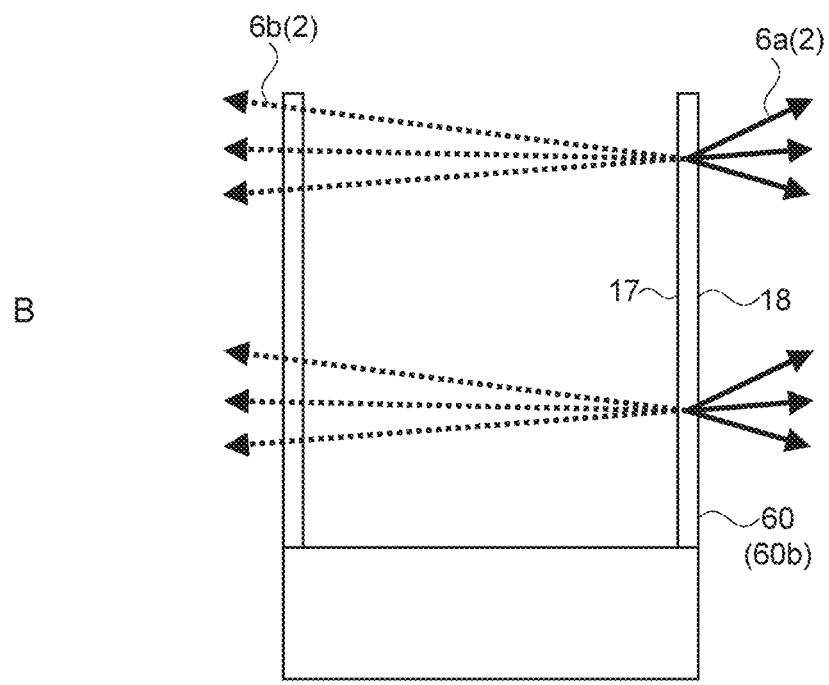
FIG.17

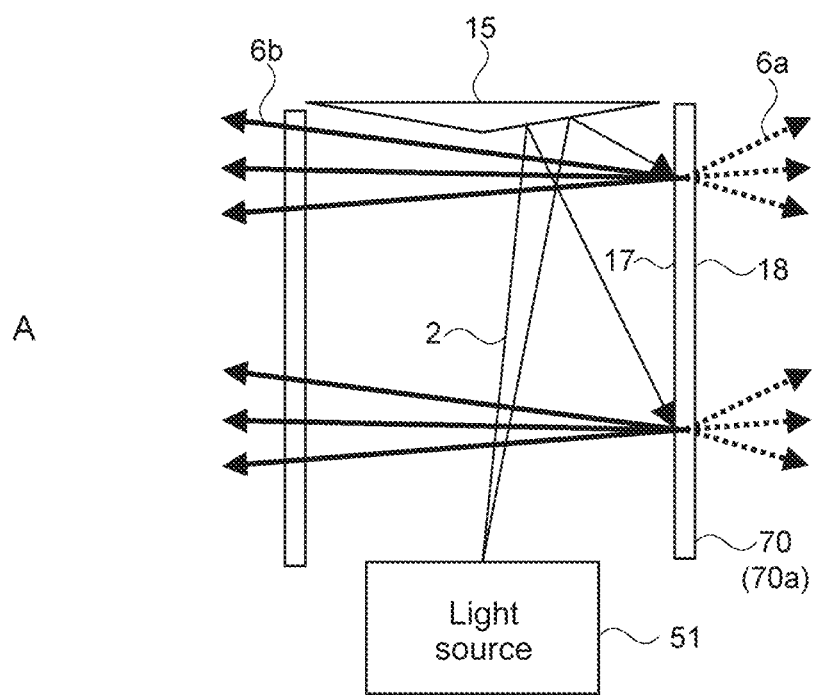
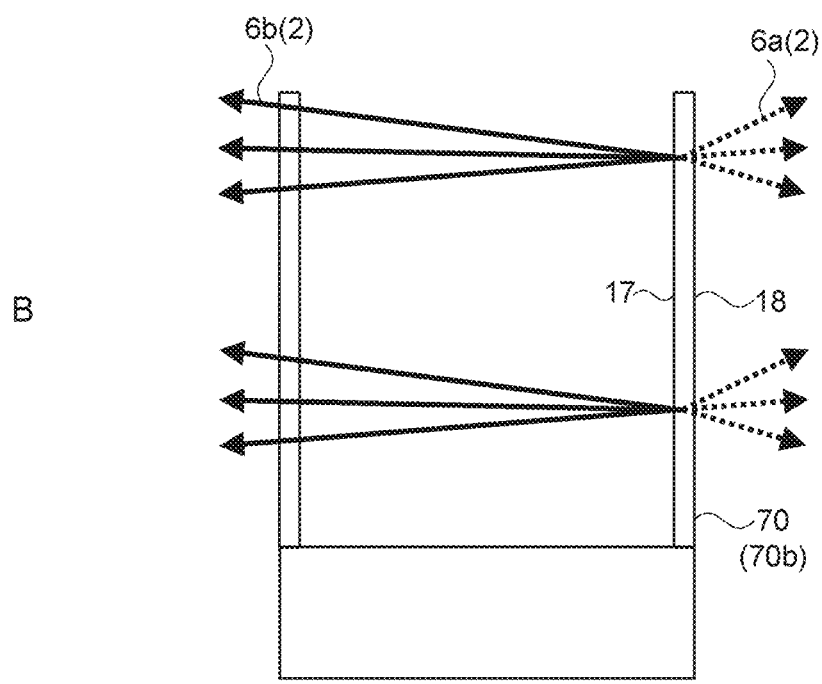
FIG.18

A
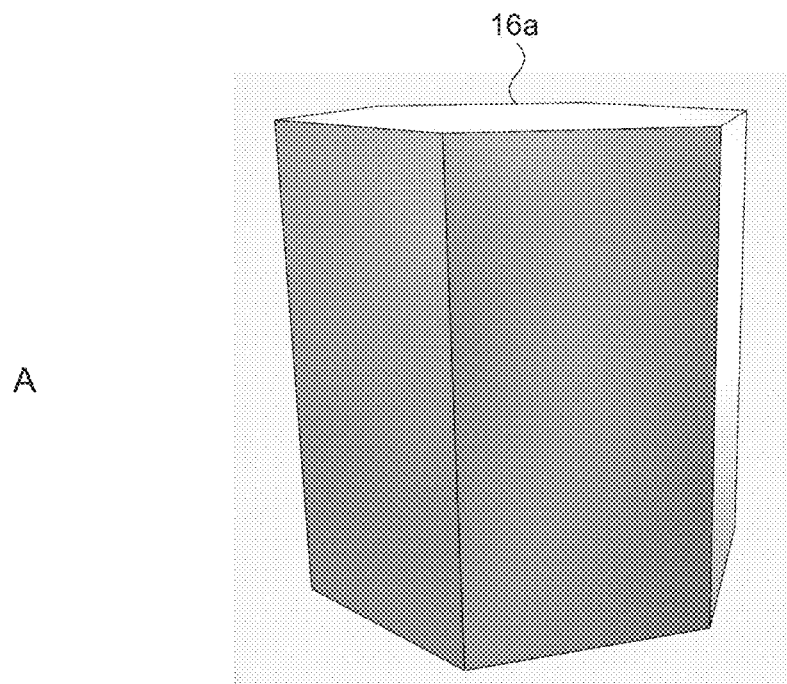
B
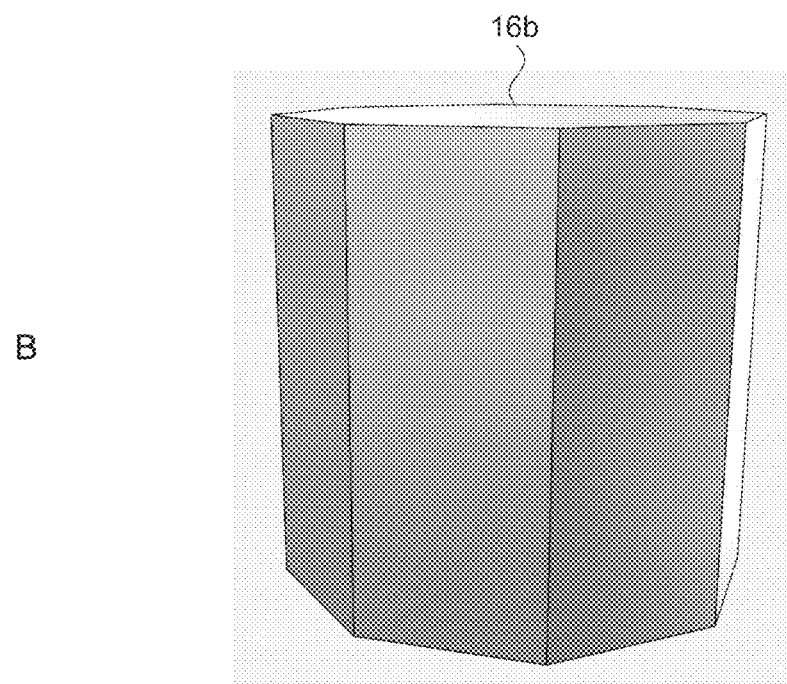
FIG.19

DISPLAY APPARATUS, DISPLAY METHOD, AND PROGRAM

CROSS REFERENCE TO RELATED APPLICATIONS

This application is a national stage application under 35 U.S.C. 371 and claims the benefit of PCT Application No. PCT/JP2021/025638, having an international filing date of 7 Jul. 2021, which designated the United States, which PCT application claimed the benefit of Japanese Patent Application No. 2020-122144, filed 16 Jul. 2020, the entire disclosures of each of which are incorporated herein by reference.

TECHNICAL FIELD

The present technology relates to a display apparatus, a display method, and a program that are used to display an image.

BACKGROUND ART

A technology that assists communication between users has been developed in the past. For example, Patent Literature 1 discloses a meeting assistance system that presents an image of a participant in a meeting and information regarding speech of the participant. In the system, an image of a participant in a meeting is captured using a wide-angle camera to create an individual image of each participant. Further, speech information that indicates a speech time and whether the participant is speaking is acquired from the image of the participant. Then, a screen in which the image of each participant and the information regarding speech of the participant are associated with each other, is displayed on a specified display. This makes it possible to accurately recognize a state of speech of each participant (for example, paragraphs [0044], [0047], and [0151] of the specification and FIGS. 2 and 23 in Patent Literature 1).

CITATION LIST

Patent Literature

Patent Literature 1: Japanese Patent Application Laid-open No. 2015-19162

DISCLOSURE OF INVENTION

Technical Problem

In the method disclosed in Patent Literature 1, a talk may be interrupted by, for example, a line of sight being moved toward a display when information regarding the talk is checked. Thus, there is a need for a technology that makes it possible to naturally facilitate communication between users.

In view of the circumstances described above, it is an object of the present technology to provide a display apparatus, a display method, and a program that make it possible to naturally facilitate communication between users.

Solution to Problem

In order to achieve the object described above, a display apparatus according to an embodiment of the present technology includes a display section, an acquisition section, and an image generator.

The display section includes a display that has a cylinder-like body and on which an output image is displayed.

The acquisition section acquires pieces of direction information that respectively indicate directions of respective users of a plurality of users as viewed from the display.

The image generator generates the output image on the basis of the pieces of direction information such that pieces of information that respectively correspond to the users of the plurality of users are presented in the respective directions of the users of the plurality of users.

In this display apparatus, directions of respective users of a plurality of users as viewed from the display having a cylinder-like body are acquired. Further, an output image in which pieces of information respectively corresponding to the users of the plurality of users are presented in the respective directions of the users of the plurality of users, is generated to be displayed on the display. This enables a certain user to easily grasp not only information regarding the certain user but also information regarding another user. This makes it possible to naturally facilitate communication between the users.

The display may be a transparent display through which visible light is transmitted.

The display may include an inner peripheral surface and an outer peripheral surface, and the display may be configured such that the output image is displayed on the outer peripheral surface and such that the output image displayed on the outer peripheral surface is visible from the inner peripheral surface.

The display may include an inner peripheral surface and an outer peripheral surface, and the display may be configured such that the output image is displayed on the inner peripheral surface and such that the output image displayed on the inner peripheral surface is visible from the outer peripheral surface.

The display may be an opaque display through which visible light is not transmitted.

The display may include an inner peripheral surface and an outer peripheral surface, and the output image may be displayed on the outer peripheral surface. In this case, the image generator may generate the output image in which information presented on a portion of the outer peripheral surface that is situated in back as viewed from the user, looks as if the information was seen through the display as viewed from the user.

The display section may include a projection section that projects image light that makes up the output image. In this case, the display may be a diffusion screen that diffuses the projected image light. Further, the image generator may arrange information displayable at a lower resolution in a region, on the display, to which a projection distance of the image light is larger.

The display apparatus may further include a motion sensor that detects a user who is watching the display. In this case, the acquisition section may generate the direction information on the basis of a result of the detection performed by the motion sensor.

A viewing angle of the display may be set such that at least a portion of information presented on a lateral side of the display as viewed from the user, is visible to the user with a specified brightness.

On the basis of at least one of the number of the users, a viewing angle of the display, a width of the display, or a watching distance of the user to the display, the image generator may set a direction range in which information that corresponds to the user is presented.

The display section may include an adjustment element that adjusts a viewing angle of the display.

The output image may include an interface screen on which information regarding a talk that the plurality of users is having is presented.

The image generator may generate an individual screen on which information that corresponds to each of the plurality of users is presented. In this case, the image generator may generate the output image in which the individual screens are arranged in the respective directions of the users of the plurality of users.

The image generator may present the individual screen of a first user in a direction of a second user, the direction of the second user being different from a direction of the first user.

The individual screen may include an icon that represents at least one of an amount of speech of a corresponding one of the plurality of users, a time of the speech, a pattern of the speech, or contents of the speech.

The image generator may generate a shared image that represents information to be shared by the plurality of users, and may display the shared image such that the shared image is moved circumferentially along the display.

The image generator may color-code pieces of information that respectively correspond to the users of the plurality of users to display the color-coded pieces of information.

The display may be a cylindrical display or a prismatic display.

The display apparatus may further include a housing section that is connected to an end edge of the display, and a lateral surface display that is provided to a lateral surface of the housing section. In this case, the image generator may generate an image in conformity with the output image displayed on the display, the generated image being displayed on the lateral surface display.

A display method according to an embodiment of the present technology is a display method that is performed by a computer system, the display method including acquiring pieces of direction information that respectively indicate directions of respective users of a plurality of users as viewed from a display that has a cylinder-like body and on which an output image is displayed.

The output image is generated on the basis of the pieces of direction information such that pieces of information that respectively correspond to the users of the plurality of users are presented in the respective directions of the users of the plurality of users.

A program according to an embodiment of the present technology causes a computer system to perform a process including:

Acquiring pieces of direction information that respectively indicate directions of respective users of a plurality of users as viewed from a display that has a cylinder-like body and on which an output image is displayed; and generating the output image on the basis of the pieces of direction information such that pieces of information that respectively correspond to the users of the plurality of users are presented in the respective directions of the users of the plurality of users.

BRIEF DESCRIPTION OF DRAWINGS

FIG. 1 schematically illustrates an example of a configuration of a display apparatus according to an embodiment of the present technology.

FIG. 5 schematically illustrates an image of a meeting using the display apparatus.

FIG. 9 is a flowchart illustrating a basic operation of the display apparatus.

FIG. 10 schematically illustrates an example of displaying a graph on the individual screen.

FIG. 17 schematically illustrates an example of a configuration of a transparent display that has a cylinder-like body, where an image is displayed on the outside of the display.

FIG. 18 schematically illustrates an example of a configuration of a transparent display that has a cylinder-like body, where an image is displayed on the inside of the display.

FIG. 19 schematically illustrates examples of configurations of displays according to other embodiments.

MODE(S) FOR CARRYING OUT THE INVENTION

Figure 2:
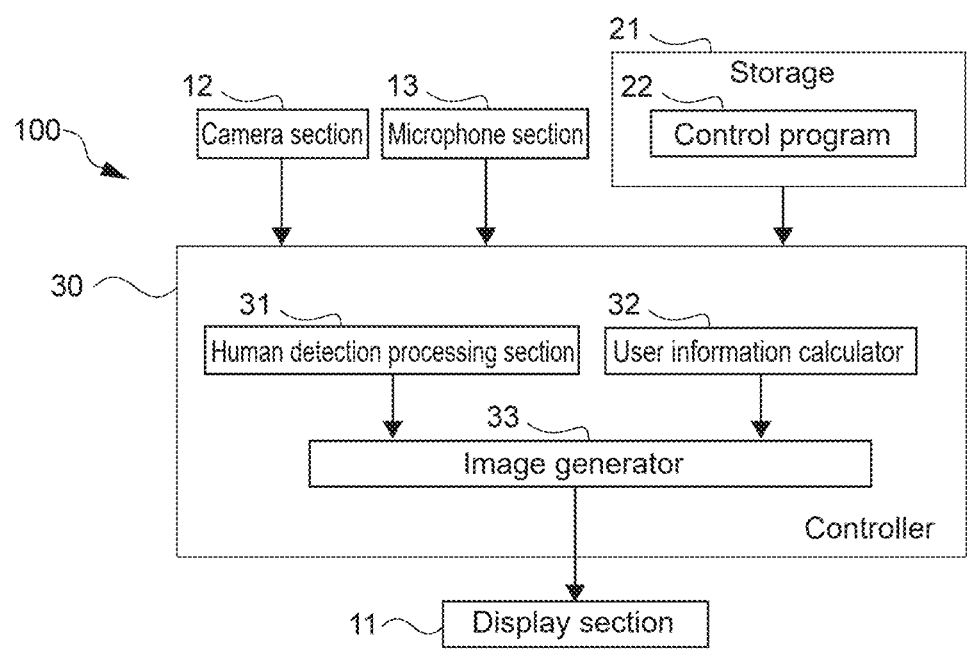
FIG. 2 is a block diagram illustrating an example of a functional configuration of a display apparatus illustrated in FIG. 1.

Embodiments according to the present technology will now be described below with reference to the drawings.

[Configuration of Display Apparatus]

FIG. 1 schematically illustrates an example of a configuration of a display apparatus according to an embodiment of the present technology.

A display apparatus 100 is a display that has a cylinder-like body and can display an image in various directions. Examples of the image in the present disclosure include a still image and a moving image (a video).

The display apparatus 100 is used by being arranged at a place that can be seen by a plurality of participants participating in, for example, a meeting, and presents various information to each participant to provide meeting assistance services (for example, refer to FIG. 5).

Thus, users of a plurality of users using the display apparatus 100 are participants in a meeting. Note that, in the present disclosure, the meeting refers to a state in which people participate in, for example, a talk, and a size, a type, a theme, and the like of the meeting are not limited.

Examples of a scene in which the display apparatus 100 is used include not only the meeting described above, but also various scenes such as an interview, a face-to-face talk, a drinking party, and everyday talk. For example, the display apparatus 100 may be used when people have a talk at a restaurant or a cafe, or sit around a table to have a talk. Further, the display apparatus 100 can also be used by being surrounded by people at a drinking party. Furthermore, the display apparatus 100 may be used by being placed at, for example, a dining room or a living room at home. Moreover, as in the case of an open-air fire being surrounded, the display apparatus 100 can also be used by being surrounded by people who are having a talk.

As described above, the display apparatus 100 is used when a plurality of users has a talk, and is an apparatus that displays, as appropriate, information that assists such a talk.

An example in which the display apparatus 100 is used during a meeting is primarily described below.

In the present embodiment, the display apparatus 100 is an apparatus of which the entirety has a cylindrical shape. A direction parallel to a central axis O of the cylindrical display apparatus 100 (a direction in which the display apparatus 100 extends) is hereinafter referred to as a Z-axis direction. Further, directions that are orthogonal to each other in a plane vertical to the Z-axis direction are referred to as an X-axis direction and a Y-axis direction.

A of FIG. 1 is a side view illustrating an appearance of the display apparatus 100 as viewed in the Y-axis direction. B of FIG. 1 is a cross-sectional view illustrating a cross section obtained by cutting the display apparatus 100 along the XZ plane including the central axis O.

As illustrated in FIG. 1, the display apparatus 100 includes a base section 10, a display section 11, a camera section 12, and a microphone section 13.

The base section 10 is a housing that serves as a base of the display apparatus 100. The display apparatus 100 is used by the base section 10 being arranged on, for example a desk or a floor. In the following description, a side, of the display apparatus 100, on which the base section 10 is provided is referred to as a lower side of the display apparatus 100, and the opposite side of the display apparatus 100 (a side on which a reflective mirror 15 described later is provided) is referred to as an upper side of the display apparatus 100.

The base section 10 includes a substantially cylindrical lateral surface, and a bottom surface connected to a lower side of the lateral surface. The base section 10 is hollow. An image projection section 14, a storage 21, a controller 30, and the like of the display section 11 that are described later are provided in a space within the base section 10. Further, the camera section 12 and the microphone section 13 are provided to the lateral surface of the base section 10. Moreover, for example, a communication module and a power module (not illustrated) may be provided to the base section 10.

In the present embodiment, the base section 10 corresponds to a housing section that is connected to an end edge of a display.

The display section 11 includes a screen 16 that has a cylinder-like body and on which an output image 1 is displayed, and is a display module that can perform various-direction display of displaying an image in various directions.

In the present embodiment, the output image 1 is displayed outward from the screen 16 having a cylinder-like body. Here, the output image 1 is an image that is displayed on the entirety of the surface of the screen 16. The output image 1 includes, for example, a UI screen (refer to FIG. 3) that is displayed for each direction.

In the present embodiment, a projective display module is used as the display section 11. As illustrated in FIG. 1, the display section 11 includes the image projection section 14, the reflective mirror 15, and the above-described screen 16. From among them, the screen 16 serves as a display according to the present embodiment.

The image projection section 14 projects image light 2 that makes up the output image 1. Specifically, the image projection section 14 is a projector that projects the image light 2 of the output image 1, with image data of the output image 1 being used as input.

Here, the image light 2 is light that makes up an image (the output image 1), and includes a light beam used to display each pixel included in the image. The image light 2 is radially projected about a specified optical axis. As illustrated in B of FIG. 1, the image projection section 14 is arranged in the space within the base section 10 to face the upper side of the display apparatus 100, such that the optical axis coincides the central axis O.

Typically, the image projection section 14 is a color projector that can display a color image. However, a projector or the like that performs display in one color may be used.

A specific configuration of the image projection section 14 is not limited. For example, a laser projector that includes a laser source is used. Further, a projector that includes a light source such as a light emitting diode (LED) light source or a halogen lamp may be used.

The image light 2 projected by the image projection section 14 is reflected off the reflective mirror 15 to be headed for the screen 16. The reflective mirror 15 includes a reflecting surface off which the image light 2 is reflected, and is arranged on the upper side of the display apparatus 100 such that the reflecting surface faces the image projection section 14.

Typically, the reflective mirror 15 is designed such that the image light 2 reflected off the reflecting surface is incident at any point on the screen 16 at an equal angle of incidence. Such a design can be obtained by, for example, forming the reflecting surface as appropriate using a paraboloid or a freeform surface.

In the example illustrated in B of FIG. 1, the image light 2 radially projected about the central axis O is reflected off the reflective mirror 15 to be headed in a direction away from the central axis O in the form of light substantially parallel (parallel light) in a plane that includes the central axis O. This enables the image light 2 to be incident on the screen 16 at a fixed angle of incidence. Further, the angle of incidence on the screen 16 can be controlled by controlling the angle of parallel light.

Moreover, a specific configuration of the reflective mirror 15 is not limited.

The screen 16 is a screen having a shape of a cylinder (a display having a shape of a cylinder), with the central axis O being a central axis of the cylinder. The screen 16 is used by being bonded to, for example, the inside or the outside of a cylindrical transparent member (not illustrated). Alternatively, the screen 16 itself may be formed as a structure member. The base section 10 is connected to a lower end edge of the screen 16, and the reflective mirror 15 is connected to an upper end edge of the screen 16.

The screen 16 includes an inner peripheral surface 17 and an outer peripheral surface 18. The inner peripheral surface 17 is an inner surface of the screen 16, that is, a surface that faces the central axis O. Further, the outer peripheral surface 18 is an outer surface of the screen 16, that is, a surface situated opposite to the inner peripheral surface 17.

In the present embodiment, the screen 16 is a diffusion screen that diffuses the image light 2 projected by the image projection section 14.

As illustrated in FIG. 1, the image light 2 that is incident on the inner peripheral surface 17 of the screen 16 is diffused and exits from the outer peripheral surface 18 when the image light 2 passes through the screen 16. Thus, pieces of diffused light of respective pixels that make up the output image 1 exit from the outer peripheral surface 18. Consequently, the outer peripheral surface 18 serves as a cylindrical display surface on which the output image 1 is displayed. As described above, the output image 1 is displayed on the outside of the screen 16 (the outer peripheral surface 18) in the display section 11.

Further, in the present embodiment, the screen 16 is configured to be capable of displaying, in all directions of 360 degrees, an image formed circumferentially about the central axis O. In other words, the screen 16 is an all-around screen that enables an image to be displayed on all of the periphery of the all-around screen. As described above, the display apparatus 100 making it possible to view display from all directions is obtained by providing the screen 16 having a cylinder-like body.

Further, the output image 1 is displayed on the screen 16 to become an all-around image. Thus, desired information can be presented in any direction by forming the output image 1 as appropriate.

Note that the screen 16 does not necessarily have to be capable of displaying an image in all directions, and, for example, the outer peripheral surface 18 may include, in some of the directions, a structure (such as a slit) with which an image is not displayed.

Typically, a transparent diffusion screen formed using a transmissive holographic optical element (HOE) is used as the screen 16. Here, the HOE is an element that diffracts incident light using interference fringes. When exposure is performed to generate the interference fringes as appropriate, this makes it possible to change a direction in which light travels and to diffuse light.

In the present embodiment, the screen 16 substantially vertically diffusing light from the outer peripheral surface 18 is formed using a transmissive HOE, the light being incident on the inner peripheral surface 17 at a specified angle of incidence. The reflective mirror 15 described above is configured to cause the image light 2 to be incident on the screen 16 at the specified angle of incidence. Consequently, an image is displayed most brightly on the outer peripheral surface 18 of the screen 16 when the screen 16 is viewed from the vertical direction.

Note that light that is incident on the screen 16 (a transmissive HOE) at an angle other than the specified angle of incidence is transmitted through the screen 16 almost without being diffracted by interference fringes. Thus, for example, background light or the like that is vertically incident on the screen 16 passes through the screen 16 without any change. This enables a watcher (a user of the display apparatus 100) who is watching the screen 16 to watch, for example, an image superimposed on the background situated across the screen 16 from the watcher. Thus, it can be said that the screen 16 is a transparent screen (a transparent display) through which visible light is transmitted.

As described above, the display section 11 is configured to project a video coming from the image projection section 14 (a projector) onto the screen 16 (a transparent diffusion screen) in all directions of 360 degrees using the reflective mirror 15 provided to an upper surface of the display apparatus 100, the image projection section 14 being arranged at the center of a lower portion of the display apparatus 100, the screen 16 being wound in the form of a cylinder.

Note that not only the configuration using a projector and a transparent diffusion screen, but also another configuration may be used as the configuration of the display section 11. For example, the present technology can also be applied when a self-luminous display that has a cylinder-like body is used.

The camera section 12 includes a plurality of camera sensors 19 used to capture an image of a region around the display apparatus 100. In the example illustrated in FIG. 1, the plurality of camera sensors 19 is provided along the outer periphery on the lateral surface of the base section 10.

Each camera sensor 19 is arranged to capture an image of a region all around the display apparatus 100 (directions of 360 degrees). For example, when the angle of view of a single camera sensor 19 in an azimuth direction is 60 degrees, six camera sensors 19 are equally spaced on the lateral surface of the base section 10.

In the present embodiment, a user who is watching the screen 16 is detected on the basis of output performed by the camera section 12. Specifically, a direction in which the user is situated, and a distance to the user are detected by analyzing images of a region around the screen 16 that are captured by a plurality of camera sensors 19.

In the present embodiment, the camera section 12 (a plurality of camera sensors 19) serves as a motion sensor that detects a user who is watching a screen.

The camera sensor 19 is, for example, an RGB camera that captures a color image, and a digital camera that includes an image sensor such as a complementary metal-oxide semiconductor (CMOS) sensor or a charge coupled device (CCD) sensor is used as the camera sensor 19.

Further, for example, an infrared camera that receives infrared light and captures an infrared image may be used as the camera sensor 19. In this case, an infrared light source is arranged on, for example, a lateral surface of the display apparatus 100. This makes it possible to detect a watcher accurately.

The microphone section 13 includes a plurality of microphone sensors 20 used to detect sound around the display apparatus 100. In the example illustrated in FIG. 1, the plurality of microphone sensors 20 is arranged along the outer periphery on the lateral surface of the base section 10 to be situated at a higher location than the camera section 12.

In the present embodiment, for example, contents of speech of a user who is watching the screen 16 are detected on the basis of output performed by the microphone section 13. Specifically, contents of speech of each user are estimated in the form of text data from sound data detected by the plurality of microphone sensors 20.

For example, a directional microphone that selectively detects sound in a certain sound collecting range is used as the microphone sensor 20. This makes it possible to, for example, individually detect sound of each of the plurality of users. Moreover, any microphone element that can detect sound may be used.

Note that the microphone section 13 (a plurality of microphone sensors 20) can also be used as a motion sensor. In this case, for example, a direction in which a user who has produced sound is situated, is detected by analyzing, as appropriate, sound data detected by the plurality of microphone sensors 20.

Moreover, a motion sensor may be formed using a sensor other than the camera section 12 and the microphone section 13. For example, a pyroelectric sensor that performs detection using a watcher as a heat source, an ultrasonic sensor that detects ultrasonic waves that are reflected off a watcher, or a time-of-flight (ToF) sensor that measures a distance to a watcher using a ToF approach may be used. Further, one of the sensors may be used alone, or a plurality of kinds of the sensors can be used in combination.

An example in which the camera section 12 is used as a motion sensor is described below.

FIG. 2 is a block diagram illustrating an example of a functional configuration of the display apparatus 100 illustrated in FIG. 1. As illustrated in FIG. 2, the display apparatus 100 further includes the storage 21 and the controller 30.

The storage 21 is a nonvolatile storage device. For example, a recording medium using a solid-state device such as a solid-state drive (SSD), or a magnetic recording medium such as a hard disk drive (HDD) is used as the storage 21. Moreover, a type and the like of a recording medium used as the storage 21 are not limited, and, for example, any recording medium that non-transiently records therein data may be used.

The storage 21 stores therein a control program 22 used to control an operation of the overall display apparatus 100. The control program 22 is a program according to the present embodiment, and the storage 21 serves as a computer readable recording medium that records therein the program.

Moreover, the storage 21 stores therein, for example, various image data used to perform display on the screen 16. A type and the like of data stored in the storage 21 are not limited.

The controller 30 controls operations of the respective blocks of the display apparatus 100. The controller 30 is configured by hardware, such as a CPU and a memory (a RAM and a ROM), that is necessary for a computer. Various processes are performed by the CPU loading, into the RAM, the control program 22 stored in the storage 21 and executing the control program 22. The controller 30 serves as an information processing apparatus according to the present embodiment.

For example, a programmable logic device (PLD) such as a field programmable gate array (FPGA), or another device such as an application specific integrated circuit (ASIC) may be used as the controller 30. Further, for example, a processor such as a graphics processing unit (GPU) may be used as the controller 30.

In the present embodiment, a human detection processing section 31, a user information calculator 32, and an image generator 33 are implemented as functional blocks by the CPU of the controller 30 executing the control program 22 according to the present embodiment. Then, a display method according to the present embodiment is performed by these functional blocks. Note that, in order to implement each functional block, dedicated hardware such as an integrated circuit (IC) may be used as appropriate.

The human detection processing section 31 detects a plurality of users (watchers) each being watching the screen 16, and estimates a direction in which each user is situated. Specifically, the human detection processing section 31 calculates pieces of direction information that respectively indicate directions of the plurality of users, as viewed from the screen 16. In the present embodiment, the human detection processing section 31 corresponds to an acquisition section.

Here, the direction as viewed from the screen 16 is a direction (an absolute direction) when the screen 16 (the display apparatus 100) is used as a reference. For example, a direction set to be a front position for the display apparatus 100 is assumed to be an origin of the absolute direction (the absolute direction=0 degrees). Thus, the absolute direction is a direction fixed with respect to the display apparatus 100.

The human detection processing section 31 calculates, as direction information, information that can indicate an absolute direction of each user.

In the present embodiment, a user is detected on the basis of videos coming from the camera section 12 (a plurality of camera sensors 19), and direction information is calculated on the basis of a result of the detection.

Specifically, absolute directions of a plurality of users are detected from videos captured using the camera sensors 19. For example, image processing is performed on the basis of a front position set for the display apparatus 100, and the direction of a user appearing in the video is calculated in a range of +/−180 degrees (or in a range of from 0 degrees to 360 degrees).

Further, a distance to a user, as viewed from the screen 16 (the display apparatus 100), may be detected. In this case, for example, a distance to a user (a distance to a point of view) from the central axis O of the screen 16 is calculated. Moreover, a coordinate position of a user in a plane (an XY plane) that is orthogonal to the central axis O may be calculated as direction information regarding a direction of a user. Moreover, a method or the like for calculating direction information is not limited.

As described above, the human detection processing section 31 generates direction information on the basis of a result of detection performed by the camera section 12 (a motion sensor). This makes it possible to, for example, monitor a direction of each user and display a necessary image at a proper position at all times.

With respect to a plurality of users (watchers) each being watching the screen 16, the user information calculator 32 calculates user information that indicates, for example, a state of each user in a meeting. Typically, information that indicates a state of speech of a user such as an amount (for example, the number of times) of speech of a user in a meeting, a time of the speech, contents of the speech, and a pattern of the speech is calculated as the user information.

In the present embodiment, user information is calculated for each user of a plurality of users on the basis of output performed by the microphone section 13 (a plurality of microphone sensors 20).

For example, it is assumed that a user has spoken. In this case, the user information calculator 32 performs sound source estimating processing on the basis of sound data detected by a plurality of microphone sensors 20, and the user having spoken is specified. Further, sound recognition processing is performed on the basis of the sound data, and contents of speech are estimated in the form of text data. At this point, the number of times of speech (a speech amount) and the time spent in speech (a speech time) are recorded for each user.

Further, a keyword and the like are extracted from the text data and are recorded as contents of speech. Furthermore, a pattern of speech of a user (such as a positive speech or a negative speech) is determined by performing, for example, natural language processing on the text data.

Moreover, a method for calculating user information is not limited. For example, a video captured by the camera sensors 19 may be used when sound source estimating processing or sound recognition processing is performed. In this case, for example, processing of specifying a user as a speaker or processing of estimating contents of speech from a movement of lips of the user is performed when the lips of the user are moved.

Further, for example, a temperature or the like of a speaker may be detected as user information when an infrared camera or the like is included.

The image generator 33 generates the output image 1 displayed on the screen 16. Specifically, the image generator 33 generates the output image 1 on the basis of direction information such that pieces of information respectively corresponding to users of a plurality of users are presented for respective directions of the users.

As described above, the output image 1 is displayed on the screen 16 to become an all-around image. Thus, an image as viewed from a user who is watching the screen 16 is a portion of the output image 1. The image generator 33 generates the output image 1 obtained by information that is to be presented to a user being arranged in a direction in which the user is situated. At this point, the direction in which a user is situated is set on the basis of direction information.

This makes it possible to present corresponding information to each user of a plurality of users surrounding the screen 16.

In the present embodiment, the image generator 33 generates, for each user of a plurality of users, an individual screen on which corresponding information is presented, and generates the output image 1 in which individual screens are arranged in respective directions of the plurality of users.

The individual screen is a user interface screen (a UI screen) on which information corresponding to a user is displayed using a text or an icon. The image generator 33 generates an individual screen for each user who is watching the screen 16, and uses, as the output image 1, the image in which individual screens are arranged in directions of respective users. Note that any display object other than an individual screen may be included in the output image 1.

[Individual Screen]

Figure 3:
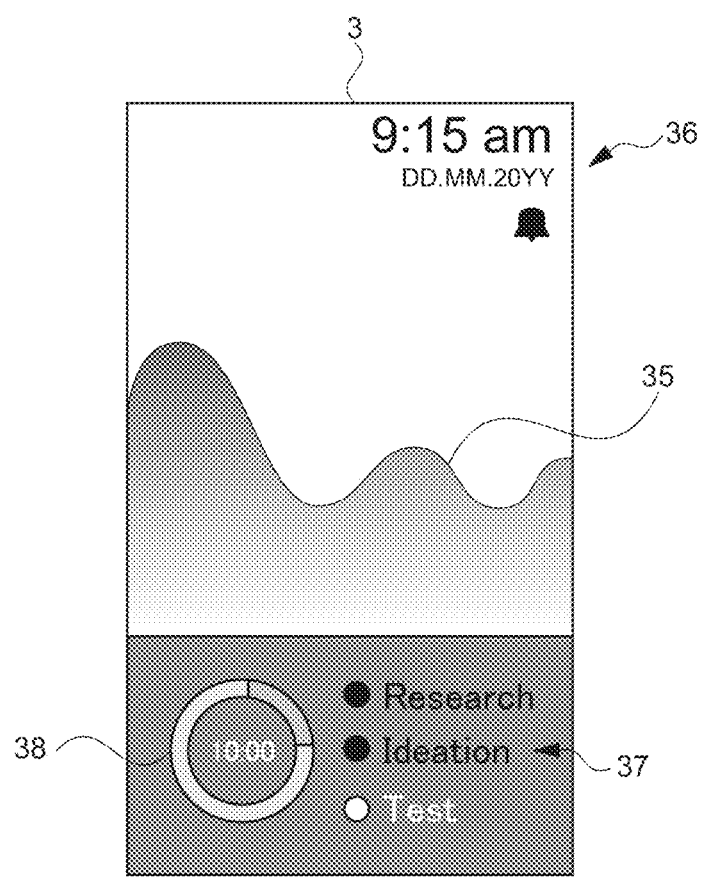
FIG. 3 schematically illustrates an example of an individual screen.

FIG. 3 schematically illustrates an example of an individual screen. FIG. 3 schematically illustrates a deployment view in which an individual screen 3 displayed along the outer peripheral surface 18 of the screen 16 is deployed in a planar manner.

The individual screen 3 is set in the form of, for example, a rectangular region. Further, objects of a plurality of objects are respectively arranged at specified positions in the region set to be the individual screen 3. The individual screen 3 illustrated in FIG. 3 has a layout in which the region of the individual screen 3 is divided into an upper region and a lower region.

The individual screen 3 includes a graph object 35, a time presentation object 36, a schedule presentation object 37, and a timer object 38. Those are all objects that each represent information to be presented to a user (information that corresponds to a user). Further, from among those objects, the graph object 35 is an object that presents specific information for each user.

The graph object 35 is an object that represents, for example, a state of speech of a user, and is arranged, with a lower end of the upper region being used as a reference. The graph object 35 is generated on the basis of user information calculated by the user information calculator 32.

FIG. 3 illustrates, as the graph object 35, a waveform graph that shows a temporal change in a parameter such as an amount of speech of a user or a pattern of the speech.

Here, a horizontal direction of the screen corresponds to time, and a vertical direction of the screen corresponds to a value of a parameter.

For example, the waveform graph is set such that the parameter exhibits a large value when, for example, the speech amount is large or a pattern of speech is positive. Further, data obtained during a certain period of time until now is plotted on the waveform graph. In this case, the waveform graph is displayed to be slid over time in the horizontal direction of the screen (for example, from right to left). This makes it possible to easily grasp the latest pattern of speech.

Further, another graph may be used instead of the waveform graph. For example, a column chart or the like that represents, for example, an accumulated value of a time of speech of a user may be used. Further, for example, a pie chart or the like that represents a proportion in a pattern of speech of a user (for example, proportions of, for example, negative and positive) may be used. Furthermore, a plurality of graphs on which different parameters are plotted may be simultaneously displayed, or switching of graphs of a plurality of graphs may be performed to display the graph as appropriate. Moreover, a specific configuration of the graph object 35 is not limited.

Further, in addition to the graph object 35, an object that is generated on the basis of user information may be arranged. For example, an image object or the like that represents contents of speech of a user (for example, a specific example of speech in a meeting) may be displayed on the individual screen 3. The image object is arranged by being superimposed on, for example, the graph object 35. Note that the image object is shared information shared by respective users (refer to FIG. 12).

As described above, the individual screen 3 includes an icon that represents at least one of an amount of speech of a corresponding user, a time of the speech, a pattern of the speech, or contents of the speech. This makes it possible to objectively present, for example, a state of speech to a user.

The time presentation object 36 is an object that presents, for example, an icon that represents a current time and date and whether there is a timer, and is arranged near an upper end of the upper region of the individual screen 3.

The schedule presentation object 37 is an object that represents a meeting schedule (such as a timetable), and is arranged in the lower region of the individual screen 3. Here, three schedule stages that are "Research", "Ideation", and "Test" are presented on a right half face of the lower region. In FIG. 3, "Test" from among them represents an on-going schedule, and an icon and word that represents "Test" is highlighted in a bright color.

The timer object 38 is an object that serves as a timer that indicates, for example, a remaining time in a meeting, and is arranged in the lower region of the individual screen 3. Here, a circular analog timer is presented on a left half face of the lower region. For example, the timer object 38 counts a remaining time for each schedule and a remaining time in the entirety of a meeting. Note that the time elapsed may be counted.

Moreover, contents and a layout of the individual screen 3 are not limited, and may be set as appropriate.

[Output Image]

Figure 4:
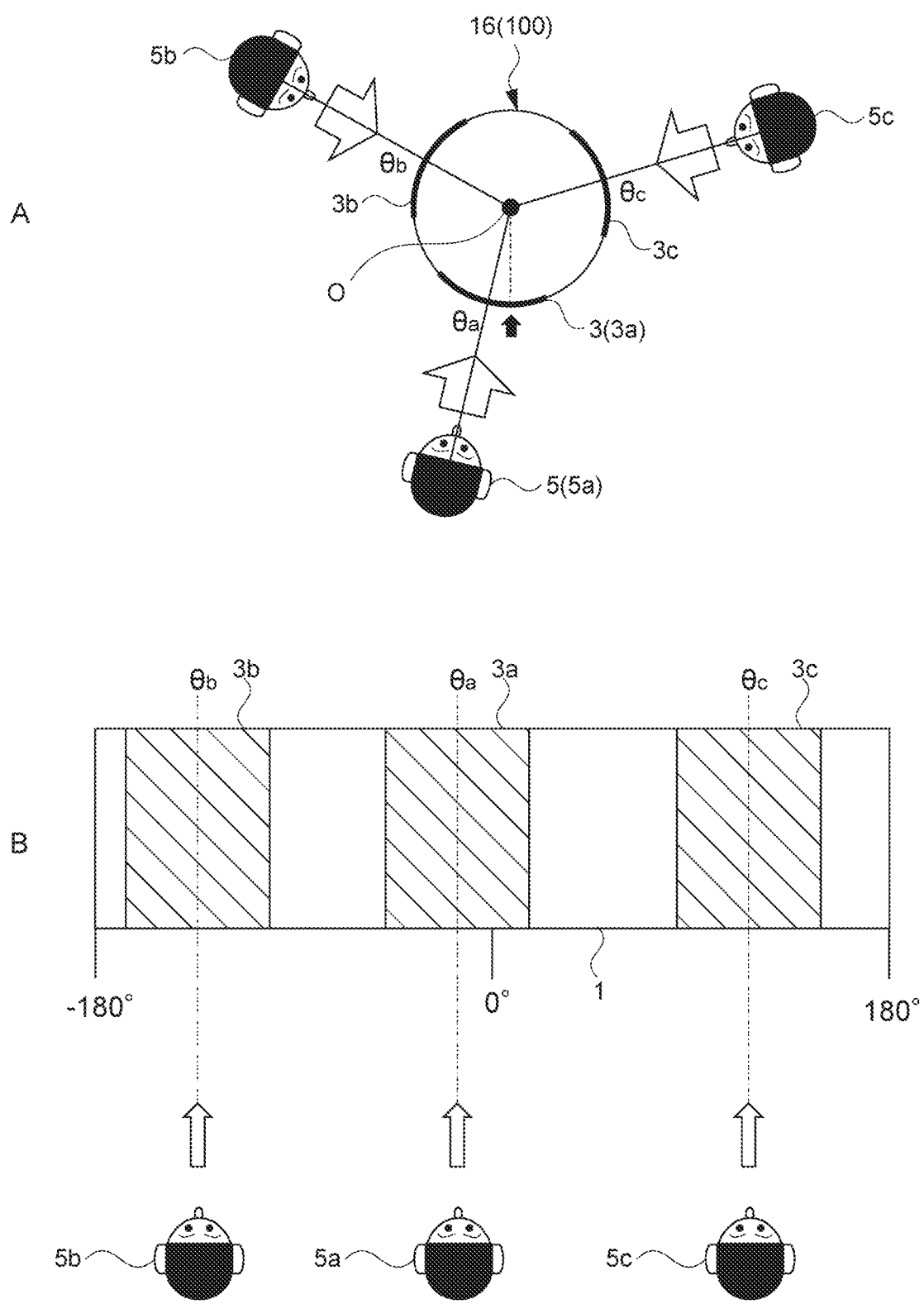
FIG. 4 is a schematic diagram used to describe a method for generating an output image.

FIG. 4 is a schematic diagram used to describe a method for generating an output image. A of FIG. 4 schematically illustrates the display apparatus 100 (the screen 16) as viewed from above. B of FIG. 4 schematically illustrates an example of the output image 1 in which a plurality of individual screens 3 is arranged.

A and B of FIG. 4 each schematically illustrate a plurality of users 5 being watching the screen 16. Here, a method for generating the output image 1 by arranging the individual screens 3 in respective directions of a plurality of users 5 is described. Note that the method described below can also be applied regardless of the number of users 5.

In A of FIG. 4, it is assumed that three users 5a to 5c who are surrounding the screen 16 are having a meeting. In the display apparatus 100, directions of the respective users 5a to 5c are estimated by the human detection processing section 31 on the basis of images captured by the camera section 12 (a plurality of camera sensors 19).

Here, it is assumed that the directions of the user 5a, the user 5b, and the user 5c as viewed from the screen 16 are θa, θb, and θc. Their angles are represented using the absolute directions, with a front position set for the screen 16 (the display apparatus 100) being a reference. A of FIG. 4 schematically illustrates the front position set for the screen 16 using a black arrow.

B of FIG. 4 schematically illustrates a deployment view in which the output image 1 displayed along the outer peripheral surface 18 of the screen 16 is deployed in a planar manner. In the deployment view (the output image 1), a horizontal direction in the figure corresponds to a direction as viewed from the screen 16, and a vertical direction in the figure corresponds to an up-and-down direction of the screen 16.

In the example illustrated in B of FIG. 4, a direction range of the output image 1 is set to be a range of +/−180 degrees, with the absolute direction=0 degrees being used as a reference. Note that the direction range of the output image 1 may be set to be a range of the absolute direction=0 degrees to 360 degrees.

For example, an individual screen 3a that corresponds to the user 5a is arranged such that the absolute direction=Ga is situated at the center of the screen. Likewise, an individual screen 3b that corresponds to the user 5b is arranged such that the absolute direction=θb is situated at the center of the screen, and an individual screen 3c that corresponds to the user 5c is arranged such that the absolute direction=θc is situated at the center of the screen.

This results in displaying the individual screens 3a to 3c in the respective directions of θa, θb, and θc, that is, in front of the users 5a to 5c. This makes it possible to present, to each user 5 being participating in a meeting, a state of speech of the user 5, a progress of the entirety of the meeting, and the like.

This enables the respective users 5 to objectively grasp, for example, a progress and a state of a talk (a meeting) that the users 5 are having. As described above, it can be said that the output image 1 is an interface screen on which information regarding a talk that a plurality of users is having is presented.

Note that, in the present embodiment, a rectangular image (a projected image) projected by the image projection section 14 to be headed for the reflective mirror 15 is generated as the output image 1. The projected image is reflected off the reflective mirror 15 to be projected onto the screen 16, and this results in the output image 1 being displayed on all of the periphery of the screen 16. Thus, an image (a projected image) actually generated as the output image 1 is an image deformed in conformity with an optical system of the display section 11.

In consideration of such a projection optical system of the display section 11, the image generator 33 generates the output image 1 such that each individual screen 3 is displayed properly in a direction of a corresponding user.

[Meeting Using Display Apparatus 100]

FIG. 5 schematically illustrates an image of a meeting using the display apparatus 100.

FIG. 5 schematically illustrates, in an upper portion, a state in which a plurality of users 5 is sitting around a desk to have a meeting. The display apparatus 100 is used by being arranged on the desk such that every user 5 can see the screen 16.

Here, five users 5d to 5h are having a meeting. In this case, the individual screens 3 are respectively displayed in directions of the corresponding users 5d to 5h. As examples of the individual screens 3, FIG. 5 illustrates, in a lower portion, individual screens 3d and 3h that can be respectively seen from the user 5d situated at a left end in the figure and from the user 5h situated at a right end in the figure.

When the individual screen 3 is displayed for each user 5, as described above, this enables each user 5 to participate in a meeting while confirming, for example, an amount of speech of the user 5 and a pattern of the speech.

Further, in the present embodiment, a transparent screen that has a cylinder-like body is adopted as the screen 16. This enables a certain user 5 to view information corresponding to another user 5 in addition to information (the individual screen 3) related to the certain user 5. In other words, the display apparatus 100 enables a certain user 5 to also view information that is being viewed by another user 5.

Characteristics of the screen 16 that make it possible to provide such a state are specifically described below.

[Characteristics of Screen]

Figure 6:
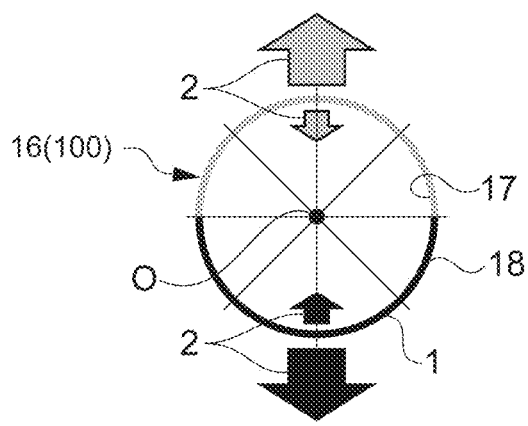
FIG. 6 is a schematic diagram used to describe display characteristics of a screen.

FIG. 6 is a schematic diagram used to describe display characteristics of the screen 16. In the present embodiment, the output image 1 is displayed not only on the outside of the screen 16 (the outer peripheral surface 18), but also on the inside of the screen 16 (the inner peripheral surface 17). In other words, the screen 16 is configured to display the output image 1 on the outer peripheral surface 18 such that the output image 1 displayed on the outer peripheral surface 18 is viewed from the inner peripheral surface 17. Note that the output image 1 as viewed from the inner peripheral surface 17 is an image obtained when the output image 1 being displayed on the outer peripheral surface 18 is viewed from a rear side of the outer peripheral surface 18. Thus, the right and left sides in the image are reversed.

FIG. 6 schematically illustrates image light 2 using a colored arrow, the image light 2 exiting the screen 16 in a direction (a watching direction) of the user 5. Here, the image light 2 of the output image 1 displayed on a front side of the screen 16 as viewed from the user 5 (in front of the user 5) is indicated by a black arrow. Further, the image light 2 of the output image 1 displayed on a rear side of the screen 16 as viewed from the user 5 (a back surface as viewed from the user 5) is indicated by a gray arrow.

Orientations of the arrows each correspond to a direction in which the image light 2 exits, and sizes of the arrows each correspond to the brightness of the image light 2. For example, the image light 2 exiting from the inside of the screen 16 exhibits a lower brightness than the image light 2 exiting from the outside of the screen 16. Thus, an image displayed on the inner peripheral surface 17 of the screen 16 is darker than an image displayed on the outer peripheral surface 18 of the screen 16. Note that the images displayed on the inner peripheral surface 17 and the outer peripheral surface 18 are the same image (the output image 1).

As described above, in the present embodiment, the image light 2 projected onto the inner peripheral surface 17 of the screen 16 is transmitted through the screen 16 to exit the screen 16 from the outer peripheral surface 18. In addition, the screen 16 is configured such that a portion of the image light 2 projected onto the inner peripheral surface 17 is reflected off the inner peripheral surface 17 to exit the screen 16 from the inner peripheral surface 17. Thus, the same output image 1 is displayed on the inside and the outside of the screen 16. In other words, the output image 1 can also be viewed from the inside of the screen 16 using the reflection off the inner peripheral surface 17.

For example, coating or the like that serves to adjust an amount of reflected light is provided to the inner peripheral surface 17 of the screen 16, and this makes it possible to display an image inside of the screen 16 with a specified brightness. Typically, the brightness of an image displayed inside of the screen 16 is set lower (for example, 10% or less) than an image displayed outside of the screen 16. Moreover, the brightness of an image displayed inside of the screen 16 may be set as appropriate according to, for example, an application or a use environment of the image display apparatus 100.

From among the pieces of image light 2 of the output images 1 displayed on the rear side of the screen 16 as viewed from the user 5, the piece of image light 2 exiting from the inner peripheral surface 17 is indicated by a small gray arrow illustrated in FIG. 6. Since the screen 16 is transparent, the piece of image light 2 exiting from the inner peripheral surface 17 is transmitted through the front side of the screen 16 as viewed from the user 5 to be watched by the user 5.

In other words, the user 5 can faintly watch information (the small gray arrow) displayed on the rear side of the screen 16 in addition to information (the large black arrow) displayed on the front side of the screen 16. This enables a certain user 5 to confirm, for example, information presented to another user 5 situated in front of or diagonally to the front of the certain user 5 across the screen 16.

For example, on the individual screen 3d, 3h illustrated in the lower portion of FIG. 5, the graph object 35 related to another user 5 situated across the screen 16 from the user 5d, 5h is schematically shown using a dotted line.

Figure 7:
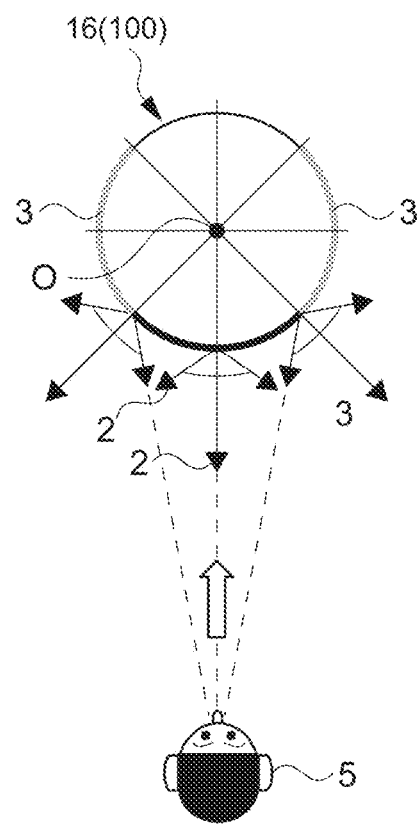
FIG. 7 is a schematic diagram used to describe viewing angle characteristics of the screen.

FIG. 7 is a schematic diagram used to describe viewing angle characteristics of the screen 16. Here, the viewing angle of the screen 16 is specifically described with reference to FIG. 7.

The viewing angle of the screen 16 refers to an angular range in which, for example, an image displayed on the screen 16 can be watched with a brightness greater than or equal to a specified brightness (hereinafter referred to as a first threshold). The first threshold is set to be, for example, a value that is 50% of a peak value. Ranges of elevation angle and azimuth angle in which an image with a brightness greater than or equal to the first threshold can be watched when a certain point on the screen 16 is watched, are a vertical viewing angle and a horizontal viewing angle, respectively.

Here, the horizontal viewing angle of the screen 16 is primarily described.

In the present embodiment, the viewing angle (the horizontal viewing angle) of the screen 16 is set such that at least a portion of information presented on a lateral side of the screen 16 as viewed from the user 5 can be watched by the user 5 with a specified brightness (hereinafter referred to as a second threshold).

Here, the information presented on the lateral side of the screen 16 as viewed from the user 5 is, for example, information presented, with a direction offset by 90 degrees from the user 5 (that is, left and right portions of the screen 16 as viewed from the user 5) being a reference.

In FIG. 7, the individual screens 3 presented on the left and right portions of the screen 16 as viewed from the user 5 are schematically indicated using gray bold lines. Further, the individual screen 3 displayed in front of the user 5 is indicated by a black bold line. Note that the width of the individual screen 3 in the azimuth direction is set to be a width obtained by equally dividing the screen 16 into four at intervals of 90 degrees (a quarter of the outer periphery of the screen 16).

Further, FIG. 7 schematically illustrates, using three arrows, a diffusion distribution of the image light 2 (diffused light) exiting from each point of the screen 16 in a horizontal plane (an XY plane). The central arrow represents a normal line of the screen 16. Further, the arrows on both sides represent a range of azimuth angle in which the image light 2 can be watched with a brightness greater than or equal to the second threshold. The length of each arrow represents a brightness (intensity) of the exiting image light 2.

Typically, the diffusion distribution of the image light 2 in the horizontal plane is set to be a bilaterally symmetrical distribution such that the image light 2 (the central arrow) exiting orthogonally to the screen 16 is brightest.

For example, it is assumed that, as illustrated in FIG. 7, the pieces of image light 2 respectively exit toward the user 5 from lateral sides of the individual screens 3 respectively presented on the right and on the left as viewed from the user 5, each of the lateral sides being situated closer to the user 5. The horizontal viewing angle of the screen 16 is set such that these lateral sides of the individual screens 3 on the right and on the left each exhibit a brightness of the second threshold. For example, the second threshold is set to a brightness identical to the brightness of the first threshold used to define the viewing angle.

Note that FIG. 7 illustrates the case in which the width of the individual screen 3 in the azimuth direction is a quarter of the outer periphery of the screen 16. However, the width of the individual screen 3 is not limited thereto. For example, the horizontal viewing angle may be set using a discretionarily set width of the individual screen 3 being used as a reference.

Further, the second threshold does not have to be identical to the first threshold used to define the viewing angle, and may be set as appropriate in a range in which the user 5 can view an image. For example, a value of a brightness lower than a brightness of a value of the first threshold (for example, 10% of a peak of brightness), or a value of a brightness higher than the brightness of the value of the first threshold (for example, 60% of the peak of brightness) may be set to be the second threshold. The horizontal viewing angle is set narrow when the second threshold is low, and the horizontal viewing angle is set wide when the second threshold is high.

At any rate, the user 5 can faintly watch at least portions of the individual screens 3 respectively displayed on the right and on the left as viewed from the user 5, in addition to his/her own individual screen 3 displayed in front.

As described above, in the display apparatus 100, the level of viewing angle characteristics (the level of display brightness) is set high for a front surface of the screen 16 as viewed from the user 5, and is set low for the lateral side of the screen 16 as viewed from the user 5. Further, information corresponding to a certain user 5 is presented in front of the certain user 5, and information corresponding to another user 5 situated on the lateral side is presented in a region on the lateral side. In other words, information that is to be viewed by a certain user 5 is clearly displayed in front of the certain user 5, whereas information corresponding to, for example, another user 5 situated on the lateral side and next to the certain user 5 is less visible than the information displayed in front, and is faintly displayed to be usable just for reference.

This enables a certain user 5 to confirm, for example, information presented to another user 5 situated next to the certain user 5 and surrounding the screen 16 together with the certain user 5.

Figure 8:
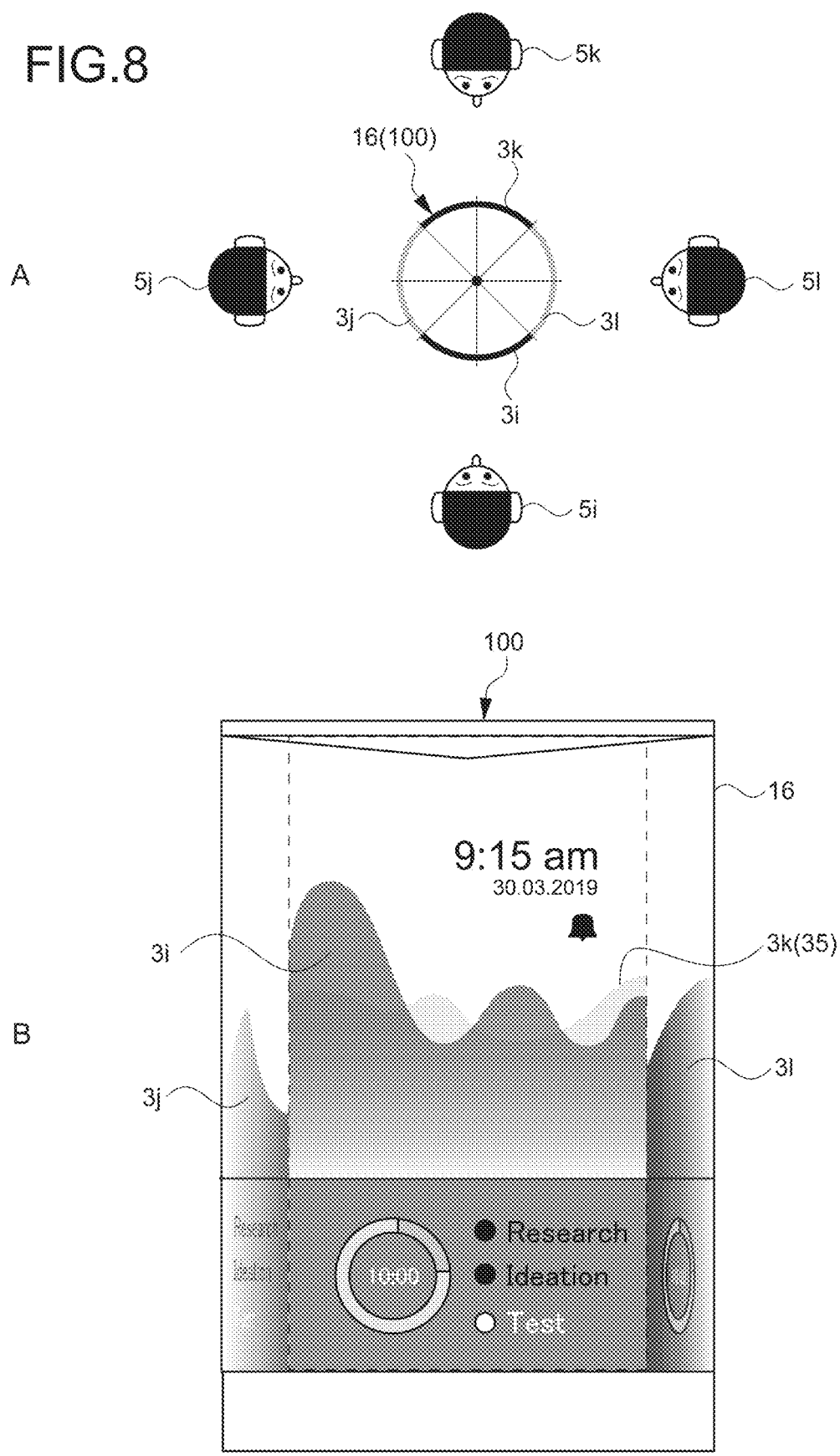
FIG. 8 is a schematic diagram used to describe a state of the screen as viewed from a user.

FIG. 8 is a schematic diagram used to describe a state of the screen 16 as viewed from the user 5. Here, it is assumed that, as illustrated in A of FIG. 8, a meeting is being held, where four users 5i to 5l situated at equally spaced positions to surround the display apparatus 100 are participating in the meeting. Further, B of FIG. 8 schematically illustrates a state of the screen 16 as viewed from the user 5i.

Note that the users 5j and 5l are respectively situated on the left and on the right of the display apparatus 100 (the screen 16) as viewed from the user 5i, and the user 5k is situated across the display apparatus 100 from the user 5i.

As illustrated in B of FIG. 8, an individual screen 3i corresponding to the user 5i is displayed in front of the user 5i. The individual screen 3i is a primary information source of which the entirety is displayed brightly and clearly.

Further, individual screens 3j and 3l that respectively correspond to the users 5j and 5l are respectively displayed on a left lateral side and on a right lateral side of the screen 16 as viewed from the user 5i. From a location where the user 5i is situated, at least portions of the individual screens 3j and 3l displayed on these lateral sides can be watched with a specified brightness, as described with reference to FIG. 7.

Further, an individual screen 3k that corresponds to the user 5k is displayed on a rear side (a back surface) of the screen 16 as viewed from the user 5i. The individual screen 3k is also displayed inside of the screen 16, as described with reference to FIG. 6. Thus, the individual screen 3k can be watched from the location where the user 5i is situated. B of FIG. 8 illustrates display of the graph object 35 of the individual screen 3k being seen through the screen 16.

The individual screens 3j and 3l, and the individual screen 3k are less visible than, for example, the primary individual screen 3i, but serve as information sources that can be used for reference in order to confirm information related to the other users 5.

As described above, the display apparatus 100 is configured such that the screen 16 is a transparent screen that has a cylinder-like body (here, a transparent cylindrical screen) and display can be viewed from the entirety of a region all around the screen 16. The screen 16 is configured such that contents of display that is being viewed by the user 5 situated across the screen 16, and contents of display that is being viewed by the user 5 situated on a lateral side can also be viewed.

This enables a certain user 5 to not only confirm contents displayed in front of the certain user 5, but also confirm a state (such as information corresponding to another user 5 situated on the opposite side) beyond the display performed in front of the certain user 5 by display of the state being seen through the screen 16. Further, not only the information corresponding to the other user 5 situated on the opposite side, but also display performed to another user 5 situated on the lateral side can be confirmed.

Further, a position at which information is displayed corresponds directly to a direction of each user 5. Thus, for example, information related to the user 5 situated on the right is also displayed on the right on the screen 16. Therefore, displayed information can be intuitively associated with information regarding a corresponding user 5. This makes it possible to naturally grasp information displayed to another dialogue participant.

Furthermore, an amount of speech of each user 5, a time of the speech, a pattern of the speech, contents of the speech, and the like are displayed in front of the user 5, using a graph or a chart. This results in indicating a state of the speech clearly. Thus, the user 5 can consciously include feedback in contents of his/her own speech.

Moreover, grasping a state of another user 5 also makes it possible to, for example, naturally facilitate communication in order for a particular person to not speak too much. This makes it possible to naturally facilitate communication between the users 5.

[Operation of Display Apparatus]

FIG. 9 is a flowchart illustrating a basic operation of the display apparatus 100. The processing illustrated in FIG. 9 is, for example, loop processing that is repeatedly performed when the display apparatus 100 is being used.

First, a plurality of users 5 situated around the display apparatus 100 is detected (Step 101). Specifically, image recognition processing or the like is performed by the human detection processing section 31 on a video captured by the camera section 12 (the camera sensors 19), and the users 5 participating in a meeting are detected. Here, direction information that indicates a direction (an absolute direction) of each user 5 as viewed from the screen 16 is calculated.

Next, user information regarding each user 5 is calculated (Step 102). Specifically, sound source estimating processing, sound recognition processing, or the like is performed by the user information calculator 32 on sound data collected by the microphone section 13 (a plurality of microphone sensors 20), and contents of speech of each user 5 is estimated. User information that indicates a state of speech of the user 5 (such as an amount of the speech, a time of the speech, a pattern of the speech, and contents of the speech) is calculated for each user 5 on the basis of a result of the estimation.

For example, the number of times of speech of the user 5 is counted as a speech amount. Alternatively, the number of words in contents of speech may be counted as the speech amount. Further, for example, the time the user 5 has spent speaking (a speech time) is measured. Furthermore, for example, it is determined whether contents of speech of the user 5 are negative or positive, and a pattern of speech is expressed numerically. Moreover, for example, a proper noun and the like that are keywords in the contents of the speech are extracted as appropriate.

Next, the output image 1 to be displayed on the screen 16 is generated (Step 103). Specifically, the individual screen 3 corresponding to each user 5 is generated by the image generator 33 on the basis of user information related to the user 5 (refer to FIG. 3). Further, the output image 1 in which the individual screen 3 corresponding to each user 5 is arranged in a direction of the user 5 on the basis of direction information related to the user 5 (refer to FIG. 4).

The generated output image 1 is output to the display section 11 (the image projection section 14), and the image light 2 making up the output image 1 is projected onto the screen 16. This results in displaying, on the screen 16, the output image 1 in which the individual screen 3 is presented for each user 5.

As described above, a position of the individual screen 3 is set according to a direction of the user 5. Moreover, a width, a layout, a theme color, and the like of the individual screen 3 are set by the image generator 33.

The width of the individual screen 3 is a direction range in which each individual screen 3 is displayed. A portion or the like in which contents of display are not readable may occur if the width of the individual screen 3 is too large. Further, an amount of displayable information may be restricted if the width of the individual screen 3 is too small.

Thus, in the image generator 33, the width of the individual screen 3 is set as appropriate according to, for example, a state of use of the display apparatus 100.

For example, the width of the individual screen 3 is set according to the number of users 5. In this case, the width of the individual screen 3 is set smaller if there are a larger number of users 5. This makes it possible to present the individual screen 3 in a proper size depending on the number of users 5.

Further, the width of the individual screen 3 may be set on the basis of the viewing angle of the screen 16. For example, a range in which an image displayed on the screen 16 can be watched is smaller if the viewing angle (the horizontal viewing angle) of the screen 16 is narrower (refer to FIG. 7). Thus, a direction range in which an image can be properly watched is calculated by the image generator 33 on the basis of the viewing angle of the screen 16. The direction range is set to be the width of the individual screen 3.

Furthermore, the width of the individual screen 3 may be set on the basis of the width of the screen 16 (such as a diameter of the screen 16). For example, when the screen 16 has a large diameter, the width of the individual screen 3 can be set large. Conversely, when the screen 16 has a small diameter, the width of the individual screen 3 is adjusted to be small such that a necessary number of individual screens 3 can be arranged.

Further, the width of the individual screen 3 may be set on the basis of a watching distance of the user 5 to the screen 16. For example, if the watching distance is sufficiently small, a range, on the screen 16, that can be watched by the user 5 is smaller, compared to when the watching distance is large. Thus, the width of the individual screen 3 is set by the image generator 33 on the basis of the watching distance of the user 5, such that the individual screen 3 is in a range in which the individual screen 3 is visible to the user 5.

Moreover, the method for setting the width of the individual screen 3 is not limited. For example, the methods described above may be combined as appropriate to set the width of the individual screen 3.

As described above, a direction range in which information (the individual screen 3) corresponding to the user 5 is presented is set by the image generator 33 on the basis of at least one of the number of users 5, a viewing angle of the screen 16, a width of the screen 16, or a watching distance of the user 5 to the screen 16. This makes it possible to present the individual screen 3 in a proper size suitable for characteristics or a use environment of the display apparatus 100.

Further, a layout of the individual screen 3 is set by the image generator 33 according to the width of the individual screen 3. Specifically, a position and a type of an object arranged on the individual screen 3, the number of the objects, and the like are set according to a size of the individual screen 3.

For example, when the individual screen 3 has a small width, one of the schedule presentation object 37 and timer object 38 illustrated in, for example, FIG. 3 is displayed. Alternatively, instead of a graph of a time waveform, an indicator or the like that indicates, for example, an accumulated value of a parameter is displayed as the graph object 35. Conversely, when the individual screen 3 has a large width, another object is added. Moreover, contents of display on the individual screen 3 may be changed as appropriate according to a width of the individual screen 3.

Further, a theme color of the individual screen 3 is set by the image generator 33. The theme color represents a color tone of the individual screen 3, and, for example, the individual screen 3 set in totality in a color tone such as a tone of red, blue, or green is generated.

In the present embodiment, theme colors different from each other are set for the individual screens 3 for the respective users 5. In other words, the image generator 33 color-codes pieces of information (the individual screens 3) respectively corresponding to the users 5 of a plurality of users 5 to display the color-coded pieces of information.

For example, as described with reference to B of FIG. 8, a certain user 5 can also watch the individual screen 3 corresponding to another user 5 through the screen 16. The individual screens 3 of the other users 5 are color-coded by theme color, and this makes it possible to easily distinguish between the individual screens 3.

Returning to FIG. 9, when the output image 1 is generated to be displayed on the screen 16, it is determined whether to terminate processing of displaying the output image 1 that is performed by the display apparatus 100 (Step 104).

For example, when the meeting is over and an application of the display apparatus 100 has been stopped, it is determined that the display processing has been terminated (Yes in Step 104), and the loop processing is terminated. Further, when the application has not been stopped yet, it is determined that the display processing has not been terminated (No in Step 104), and the processes of and after Step 101 are performed again.

As described above, processing of presenting the individual screens 3 in respective directions of the users 5 is continuously performed by the display apparatus 100.

[Example of Display on Screen]

FIG. 10 schematically illustrates an example of displaying a graph on the individual screen 3. Here, for example, a method for showing a pattern of speech of the user 5 by changing representation of the graph object 35 indicating a temporal change in, for example, an amount of the speech, is described.

With respect to the graph object 35 illustrated in FIG. 10, it is assumed that a waveform of a graph is changed according to, for example, a speech amount, and a color arrangement on the graph and a level of a change in a waveform on the graph are changed according to a pattern of speech. In this case, the graph object 35 serves as an icon that represents both an amount of speech of the user 5 and a pattern of the speech.

(a) of FIG. 10 schematically illustrates the graph object 35 displayed when the pattern of speech of the user 5 is positive or normal, that is, when the pattern of the speech is not negative. When the pattern of the speech is not negative, a graph has a color arrangement in which a relatively less noticeable color (such as light blue or light green) is set for the graph. Further, for example, an amplitude (a height of a waveform) of the graph is adjusted to be in a specific range, and display is performed.

This makes it possible to display the graph object 35 such that the graph object 35 is less noticeable with respective to the user 5 being giving a positive or normal speech.

(b) of FIG. 10 schematically illustrates the graph object 35 displayed when the pattern of speech of the user 5 is negative. When the pattern of the speech is negative, a graph has a color arrangement in which a noticeable color (such as dark red) is set for the graph, as illustrated in (b) of FIG. 10.

Further, a range in which the amplitude of the graph is changed is set to be a range larger than the amplitude range set in (a) of FIG. 10.

As described above, with respective to the user 5 being giving a negative speech, the graph object 35 is displayed with a noticeable effect, that is, a visually obstructive effect. This makes it possible to make the user 5 having a pattern of negative speech feel that his/her speech is obstructive.

Further, the display apparatus 100 makes it possible to inform another user 5 of information indicating that there is a negative speech. Such information is used as information for judgement that is used when, for example, points under discussion in a meeting are switched. As described above, a pattern of speech of each user 5 can be shared. This makes it possible to naturally facilitate a constructive discussion.

Figure 11:
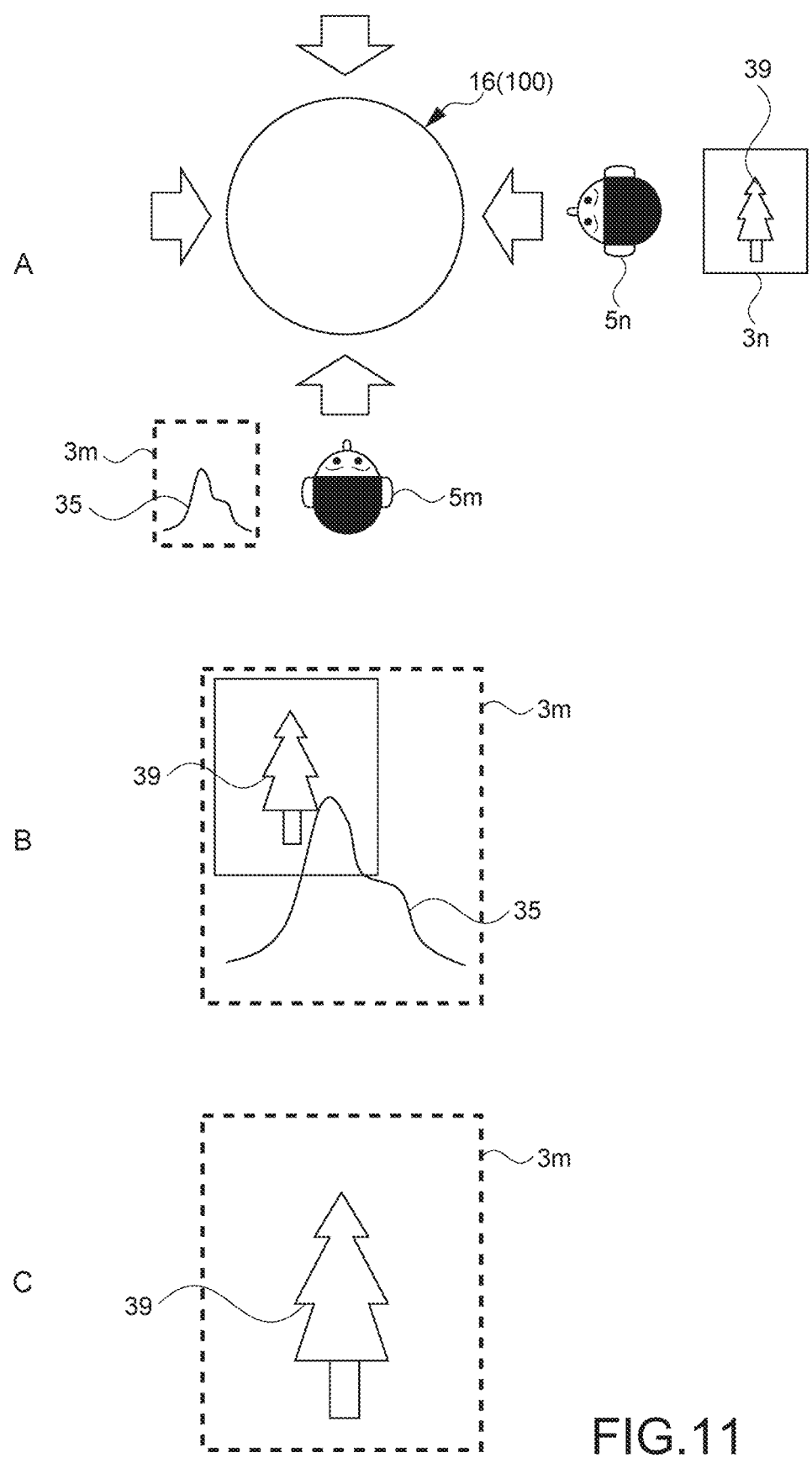
FIG. 11 is a schematic diagram used to describe processing of switching screens.

FIG. 11 is a schematic diagram used to describe processing of switching screens.

The switching processing is processing of display switching such that information presented to a certain user 5 is displayed to another user 5. In other words, the switching processing can be processing of positively presenting, to a certain user 5, information individually presented to another user 5. The switching processing is specifically described below with reference to FIG. 11.

A of FIG. 11 schematically illustrates an example of the individual screen 3 displayed for each user 5. A of FIG. 11 schematically illustrates an individual screen 3m that is displayed in a direction of a user 5m, and an individual screen 3n that is displayed in a direction of a user 5n who is situated ahead on the right, as viewed from the user 5m.

The graph object 35 is displayed on the entirety of the individual screen 3m, and an image object 39 (here, an object that shows a tree) is displayed on the entirety of the individual screen 3n.

Switching processing of presenting contents of the individual screen 3n on the individual screen 3m is described below.

B of FIG. 11 schematically illustrates an example of a screen created by the switching processing. In the example illustrated in B of FIG. 11, contents (the image object 39) of the individual screen 3n are presented by being superimposed on original contents (the graph object 35) of the individual screen 3m that are being displayed on the individual screen 3m. At this point, the size of the superimposed image object 39 is reduced as appropriate according to, for example, the size of an unoccupied space on the individual screen 3. This enables the user 5m to confirm, from the front, the contents being viewed by the user 5n.

C of FIG. 11 schematically illustrates another example of the screen created by the switching processing. In the example illustrated in C of FIG. 11, original contents of the individual screen 3m are replaced with contents (the image object 39) of the individual screen 3n with no change. Thus, the individual screen 3m is a screen on which not the graph object 35 for the user 5m but the image object 39 for the user 5n is presented. In other words, contents of the individual screen 3m are all switched to contents of another screen. This makes it possible to confirm in detail information presented to another user 5.

As described above, the image generator 33 presents the individual screen 3 of a first user 5 in a direction of a second user 5, the direction of the second user 5 being different from a direction of the first user 5. In FIG. 11, the user 5n corresponds to the first user 5, and the user 5m corresponds to the second user 5.

The switching processing may be performed in response to an instruction being given by the user 5n or the user 5m. Alternatively, the switching processing or the like may be automatically performed.

For example, it is assumed that the user 5n performs the switching processing. In this case, contents that the user 5n is watching from the front are displayed in front of another user 5. This enables the user 5n to transmit information regarding the user 5n to the other user 5. In other words, it can be said that the switching processing is processing of also displaying, in display ranges of a plurality of other watchers, contents of a watcher (the user 5n) who is watching from the front.

Further, for example, it is assumed that the user 5m performs the switching processing. In this case, contents that the user 5m (a watcher who is watching from the front) is watching from the front are replaced with information regarding the user 5n of a switching-processing target. This enables the user 5m to confirm the information regarding the target user 5. In other words, it can also be said that the switching processing is processing of presenting, to a watcher (the user 5m) who is watching from the front, contents displayed to a watcher other than the watcher being watching from the front.

As described above, the switching processing enables the users 5 to share information. This makes it possible to provide, for example, support to, for example, reach a shared understanding.

Figure 12:
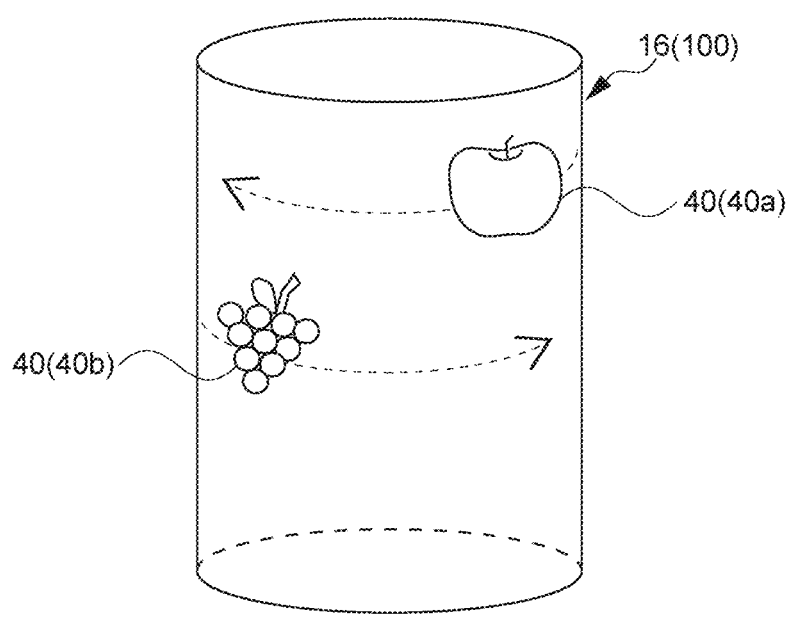
FIG. 12 schematically illustrates an example of processing of displaying a shared object.

FIG. 12 schematically illustrates an example of processing of displaying a shared object. A shared object 40 is an object that represents information to be shared by the users 5 participating in a meeting.

For example, an image of, for example, a picture or graphics that represent a keyword extracted from speech of each user 5 is used as the shared object 40. Alternatively, the shared object 40 may be set in advance according to, for example, details of a meeting.

In the present embodiment, the shared object 40 corresponds to a shared image.

For example, it is assumed that the kind of fruit is discussed. In this case, graphics that represent a fruit that the user 5 has spoken about are displayed on the screen 16 as the shared object 40.

FIG. 12 schematically illustrates graphics of an apple (a shared object 40a) and graphics of a grape (shared object 40b). Of course, the type of the shared object 40 is not limited to fruits.

These shared objects 40 are displayed to be moved circumferentially along the screen 16. In other words, the respective shared objects 40 are sequentially displayed in all directions. Note that a direction in which the shared object 40 is moved is not limited. For example, a plurality of shared objects 40 may be moved in the same direction, or shared objects 40 of the plurality of shared objects 40 may be moved in different directions.

Specifically, the shared object 40 is displayed in the form of a continuous animation to be moved circumferentially along the cylindrical screen 16. When the shared object 40 is continuously moved, as described above, the shared object 40 is displayed most brightly in front of the user 5 and displayed in light colors before and after the position of the most brightly display due to the viewing angle characteristics of the screen 16. This makes it possible to impressively present the shared object 40.

Note that the shared object 40 does not necessarily have to be displayed continuously. For example, the shared object 40 may be displayed in directions of a plurality of users 5 one by one. In this case, each user 5 can watch the shared object 40 being discontinuously displayed to be moved circumferentially along the screen 16.

As described above, the image generator 33 generates the shared object 40 representing information to be shared by a plurality of users 5, and displays the shared object 40 such that the shared object 40 is moved circumferentially along the screen 16.

This makes it possible to present, for example, contents proposed by each user 5 in the form of a specific image (the shared object 40), and to cause the proposed contents to be shared by all of the participants in a meeting. Consequently, contents proposed by each user 5 and contents to be discussed are put in order, and discussion can be stimulated.

Figure 13:
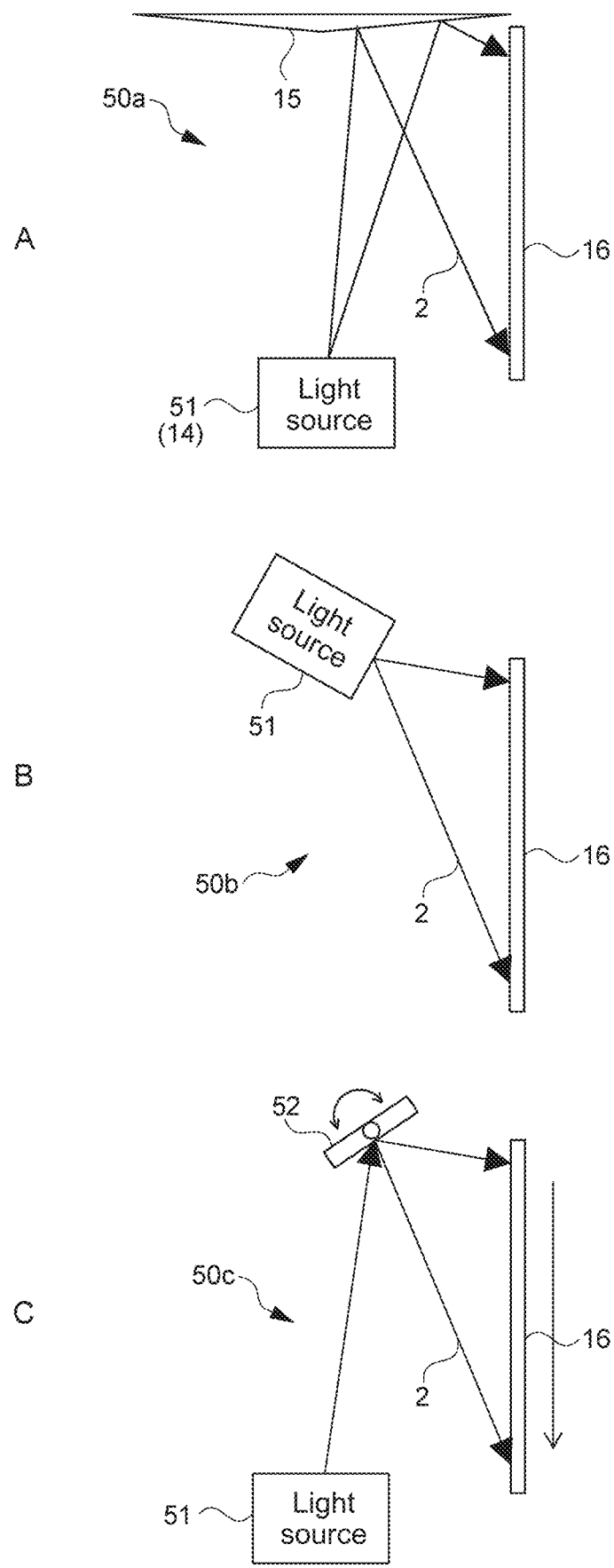
FIG. 13 schematically illustrates an example of a configuration of a projection mechanism that projects image light onto the screen.
Figure 14:
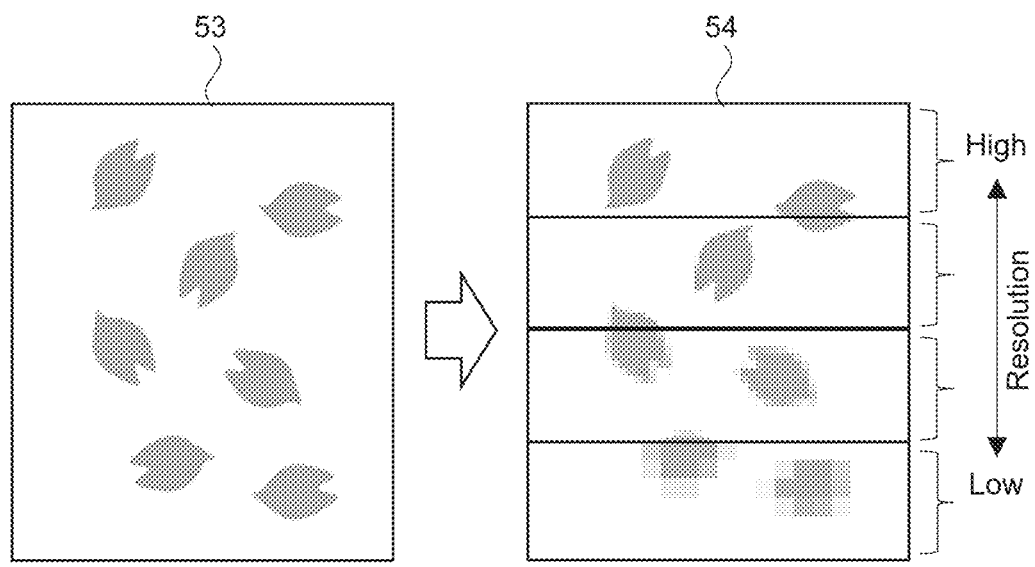
FIG. 14 schematically illustrates an example of displaying an image projected onto the screen.
Figure 15:
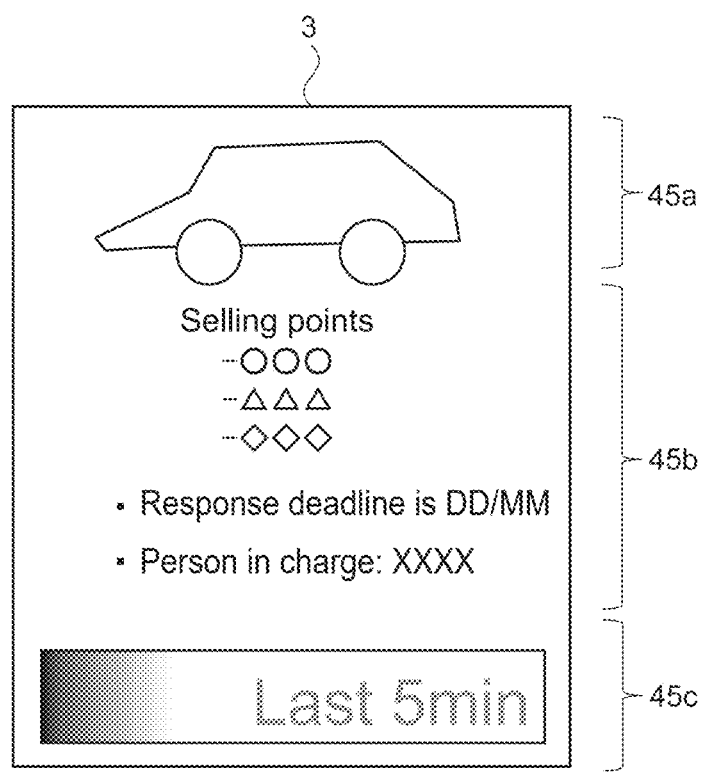
FIG. 15 schematically illustrates an example of a configuration of the individual screen projected onto a screen.

FIG. 13 schematically illustrates an example of a configuration of a projection mechanism that projects the image light 2 onto the screen 16. FIG. 14 schematically illustrates an example of displaying an image projected onto the screen 16. FIG. 15 schematically illustrates an example of a configuration of the individual screen 3 projected onto a screen.

A configuration of the output image 1 (the individual screen 3) when the projective screen 16 is used is described below with reference to FIGS. 13 to 15.

A, B, and C of FIG. 13 respectively schematically illustrate different types of projection mechanisms 50a, 50b, and 50c that can be included the display apparatus 100.

In each of the projection mechanisms 50a, 50b, and 50c, the image light 2 is projected onto the screen 16 provided in the vertical direction (an up-and-down direction in the figure). Further, a structural element (such as a light source 51) other than the screen 16 is arranged so as to not overlap the screen 16, as viewed from the horizontal direction. This makes it possible to watch the background through the screen 16.

A lower side and an upper side in the figure are respectively referred to as a lower side and an upper side of the projection mechanism.

In A of FIG. 13, the light source 51 (the image projection section 14) is arranged on a lower side of the projection mechanism 50a, and the reflective mirror 15 is arranged on an upper side of the projection mechanism 50a. The projection mechanism 50a has a configuration that is the configuration of the display section 11 included in the display apparatus 100 illustrated in, for example, FIG. 1. In the projection mechanism 50a, the distance of the screen 16 from the reflective mirror 15 is larger at a lower position on the screen 16, and thus the projection distance is larger.

In B of FIG. 13, the light source 51 is arranged on an upper side of the projection mechanism 50b, and the image light 2 is directly projected onto the screen 16 from the light source 51. In the projection mechanism 50b, the distance of the screen 16 from the light source 51 is larger at a lower position on the screen 16, and thus the projection distance is larger.

In C of FIG. 13, the light source 51 is arranged on the lower side of the projection mechanism 50b, and a scanning mirror 52 is arranged on the upper side of the projection mechanism 50b. Beam light that is the image light 2 is emitted by the light source 51 to be headed for the scanning mirror 52. The image light 2 emitted by the light source 51 is reflected off the scanning mirror 52 to be headed for the screen 16. At this point, the angle of a reflecting surface of the scanning mirror 52 is changed as appropriate, and the image light 2 (the beam light) is scanned by the scanning mirror 52. In the projection mechanism 50c, the distance of the screen 16 from the scanning mirror 52 is larger at a lower position on the screen 16, and thus the projection distance is larger.

As described above, when the projection mechanism is configured such that the background can be watched through the screen 16, a start point (such as a light source or a mirror) used when the image light 2 is projected onto the screen 16 is arranged at a position (on the upper side in FIG. 11) at which the start point does not overlap the screen 16. Thus, the projection distance of the image light 2 is larger if the image light 2 is projected onto a projection point (on the lower side in FIG. 11), on the screen 16, that is situated farther away from the start point.

As described above, if the projection distance is larger, pixels displayed on the screen 16 are more widely spaced. This results in a reduction in the resolution of an image that can be displayed.

FIG. 14 illustrates, on the left, an original image 53 provided to be projected onto the screen 16. Further, FIG. 14 schematically illustrates, on the right, a projected image 54 that is displayed by the original image 53 being projected onto the screen 16 using the projection mechanism described above. An up-and-down direction in FIG. 14 corresponds to the up-and-down direction of the screen 16 in FIG. 13.

As illustrated on the left in FIG. 14, the original image 53 is an image that is generated at a constant resolution, and is formed by pixels being equally spaced throughout the original image 53. When the original image 53 is projected onto the screen 16 using each projection mechanism illustrated in FIG. 13, the projection distance is larger at a position, on the screen 16, that is situated closer to a lower side of the screen 16. Thus, as illustrated on the right in FIG. 14, the projected image 54 displayed on the screen 16 is an image of which a portion situated closer to the lower side of the screen 16 is displayed at a lower resolution. Actually, there is a change in resolution when the original image 53 is deformed in conformity with an optical system of the projection mechanism in order to perform display on the screen 16. Note that, in FIG. 14, a change in resolution is gradually depicted.

As described above, when the projection mechanism is used, the projected image 54 is displayed at a higher resolution on a region onto which the projection distance of performing projection is smaller (an upper region on the screen 16), and the projected image 54 is displayed at a lower resolution on a region onto which the projection distance of performing projection is larger (a lower region on the screen 16).

In the image generator 33, the output image 1 is made up according to such characteristics.

FIG. 15 schematically illustrates an example of the individual screen 3 generated in conformity with a resolution on the screen 16 that is changed according to the projection distance.

In the present embodiment, a word and an image with a low spatial frequency are arranged in a region that has a low resolution and is situated away from the light source 51, and a word and an image with a spatial frequency higher than the spatial frequency of the region with a low resolution, are arranged in a region that has a high resolution and is situated close to the light source 51.

Here, an example in which the individual screen 3 is divided into three regions that are an upper region 45a, a middle region 45b, and a lower region 45c to set display contents, is described.

The upper region 45a is a region displayed on an upper portion of the screen 16, and is a region that has a higher resolution than a region other than the upper region 45a.

Thus, a high-definition image with a high spatial frequency, such as a picture and graphics, is arranged in the upper region 45a.

The middle region 45b is a region intermediate between the upper region 45a and the lower region 45c, and is a region that has a resolution lower than the upper region 45a and higher than the lower region 45c. A relatively small word and a diagram such as a graph are arranged in the middle region 45b. In FIG. 15, texts that indicate listed items for confirmation are displayed. Further, setting is performed such that the font size of a word on an upper portion of the middle region 45b is smaller than a font size of a word on a lower portion of the middle region 45b. As described above, the font size may be adjusted within the region.

The lower region 45c is a region displayed on a lower portion of the screen 16, and is a region that has a lower resolution than a region other than the lower region 45c. Thus, information with a low spatial frequency, such as a relatively large word and an indicator, that can be distinguished at a low resolution.

As described above, in the present embodiment, information that can be displayed at a lower resolution is arranged in a region, on the screen 16, to which the projection distance of the image light 2 is larger. This makes it possible to arrange an image and a word according to a desired resolution, and thus to prevent a degradation in the quality of, for example, a high-definition image.

Note that when, for example, a self-luminous display that does not include a projection mechanism is used (refer to B of FIG. 17 and B of FIG. 18), there is no need to adopt the layout illustrated in FIG. 15, and the individual screen 3 can be freely designed.

Figure 16:
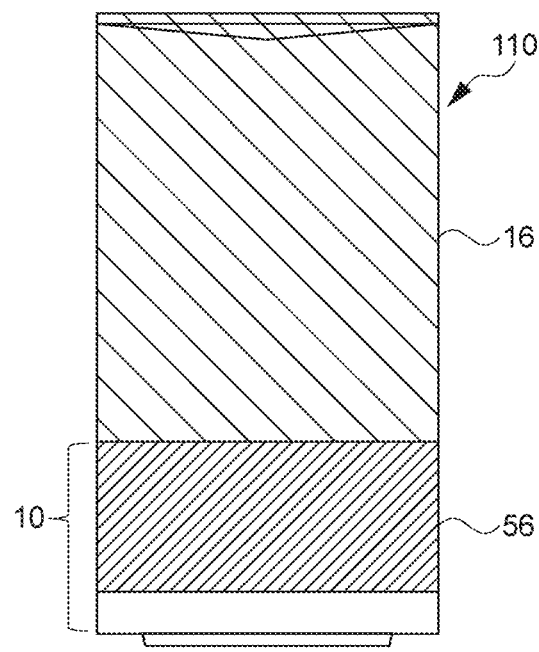
FIG. 16 schematically illustrates another example of the configuration of the display apparatus.

FIG. 16 schematically illustrates another example of the configuration of the display apparatus. As illustrated in FIG. 16, a display apparatus 110 includes a display (a lateral surface display 56) in addition to the screen 16.

The lateral surface display 56 is provided to the lateral surface of the base section 10 connected to the lower end edge of the screen 16. For example, the lateral surface display 56 covering all of the periphery of the cylindrical base section 10 is used. In this case, the lateral surface display 56 is an all-around display. Note that the lateral surface display 56 does not necessarily have to be an all-around display, and may be partially discontinuous. Further, the lateral surface display 56 may be in contact with the screen 16 or may be situated away from the screen 16.

Typically, an opaque display using, for example, liquid crystal or organic EL is used as the lateral surface display 56. A specific configuration of the lateral surface display 56 is not limited.

As described above, the lateral surface of the base section 10 accommodating therein, for example, electric parts is used as a display. Note that the camera sensor 19 and the microphone sensor 20 illustrated in A of FIG. 1 are provided as appropriate to avoid the lateral surface display 56.

The display apparatus 110 illustrated in FIG. 16 enables an all-around image to be displayed not only on the screen 16 but also on the lateral surface display 56 provided below the screen 16. In other words, it can also be said that a display range of the screen 16 is extended downward using the lateral surface display 56. This makes it possible to extend or complement display performed by the screen 16.

When the lateral surface display 56 is provided, the image generator 33 generates an image in conformity with an output image displayed on the screen 16, the generated image being displayed on the lateral surface display 56. For example, an expansion region is added below the individual screen 3 of each user 5. An image displayed on the lateral surface display 56 is generated such that the expansion region is displayed to be oriented in a direction of each user 5.

For example, display with a larger number of pixels (at a higher resolution) can be performed on the lateral surface display 56, and thus high-definition videos can be more accurately displayed on the lateral surface display 56, compared to display performed on the projective screen 16. Thus, detailed images, words in small size, and the like are assigned to the extension region. This makes it possible to also present, for example, high-definition images near a region, on the screen 16 (a lower portion of the screen 16), on which low-definition images are displayed.

As described above, the use of the lateral surface display 56 makes it possible to compensate for, for example, a state in which the number of pixels is not equal when an image is projected onto a cylindrical screen, a reduction in a level of definition depending on a projection distance, a reduction in brightness, or brightness unevenness.

Moreover, the type and the like of an image displayed on the lateral surface display 56 are not limited. For example, contents of display on the lateral surface display 56 are not visible to the user 5 situated across the screen 16 from the display contents. Thus, information and the like that are not necessary to be viewed by another user 5 may be assigned to the lateral surface display. Further, contents of display on the lateral surface display 56 do not necessarily have to be linked to display on the screen 16, and can be set discretionarily.

As described above, in the display apparatus 100 according to the present embodiment, directions of the users 5 of a plurality of users 5 as viewed from the screen 16 having a cylinder-like body are acquired. Further, the output image 1 in which pieces of information respectively corresponding to the users 5 of the plurality of users 5 are presented in the respective directions of the users 5 of the plurality of users 5, is generated to be displayed on the screen 16. This enables a certain user 5 to easily grasp not only information regarding the certain user 5 but also information regarding another user 5. This makes it possible to naturally facilitate communication between the users 5.

Examples of a meeting assistance method include a method for presenting information regarding a meeting using a planar display such as a projector or a monitor. In this case, a user turns his/her face toward the planar display when the user confirms display contents, and this may result in temporarily disturbing the concentration in a discussion or a dialogue.

Further, a method for displaying information regarding a dialogue, with a transparent planar display being provided between two dialogists, is conceivable. In this case, the dialogist can confirm the information without moving his/her line of sight broadly. On the other hand, it is difficult to precisely present information in a meeting in which a plurality of dialogists participates.

Furthermore, in a dialogue such as brainstorming in which participants of a plurality of participants face each other, there is a possibility that a particular participant will speak too much or it will be difficult for a participant to concentrate on a talk due to being worried about the allotment of time for the meeting.

In the display apparatus 100 according to the present embodiment, pieces of information (the individual screens 3) respectively corresponding to the users 5 of the plurality of users 5 are presented on the outside of the screen 16 having a cylinder-like body in respective directions of the plurality of users 5 as viewed from the screen 16.

For example, when the display apparatus 100 is used by being placed at a center position that is the center when participants of a plurality of participants face each other in a dialogue, this makes it possible to present, in front of each user 5, information regarding a state of speech (such as a time of speech and contents of speech) of the user 5 and a progress of a meeting. This enables the user 5 to confirm various information such as a meeting time in a state of facing the front. In other words, the display apparatus 100 makes it possible to present necessary information at a position at which the necessary information is easily visible to the user 5 and to assist a meeting without disturbing a discussion or a dialogue.

Further, the transparent screen 16 is used in the present embodiment. The use of such a transparent screen 16 having a cylinder-like body (a transparent display) makes it possible to not only confirm contents displayed in front, but also confirm, for example, a state beyond the display performed in front by display of the state being seen through the screen 16.

Furthermore, the screen 16 is configured such that a certain user 5 can view information regarding another user 5 situated across the screen 16 from the certain user 5 and information regarding another user 5 situated on the lateral side.

Moreover, the screen 16 has a cylinder-like body, and this makes it possible to easily associate information on the screen 16 (such as a graph) with information regarding a corresponding user. For example, information displayed on the right as viewed from a certain user 5 corresponds to information regarding another user 5 situated on the right of the certain user 5. This enables a certain user 5 to intuitively grasp, for example, a state of speech of a user 5 other than the certain user 5.

Examples of the information (the individual screen 3) displayed in front of the user 5 include a graph and a chart that indicate, for example, an amount of speech of the user 5, a time of the speech, a pattern of the speech, and contents of the speech. A state of speech is clearly indicated, as described above. Thus, the user 5 can consciously include feedback in contents of his/her own speech (for example, consciously suppressing a negative speech).

Moreover, as described above, a state of speech of another user 5 can be grasped. This also makes it possible to naturally facilitate communication in order for a particular person to not speak too much. In other words, this makes it possible to encourage a certain user 5 to give speech including feedback on, for example, a state of speech of a user 5 other than the certain user 5. This makes it possible to naturally facilitate communication between the users 5.

OTHER EMBODIMENTS

The present technology is not limited to the embodiments described above, and may achieve other various embodiments.

The example in which the transparent screen 16 having a cylinder-like body is used as a display of the display apparatus has been described above. Examples of configurations of transparent displays each having a cylinder-like body and to which the present technology can be applied are described below focused on the surface on which an output image is displayed.

FIG. 17 schematically illustrates an example of a configuration of a transparent display that has a cylinder-like body, where an image is displayed on the outside of the display. Here, from among the transparent displays each having a cylinder-like body, an outside displaying display 60 of which an outer surface (the outer peripheral surface 18) is a display surface on which an image is displayed, is described.

A of FIG. 17 is a schematic cross-sectional view of a projective outside displaying display 60*a*. B of FIG. 17 is a schematic cross-sectional view of a self-luminous outside displaying display 60*b*. Out of these, the outside displaying display 60*a* illustrated in A of FIG. 17 corresponds to the screen 16 of the display apparatus 100 described above.

The outside displaying display 60*a* illustrated in A of FIG. 17 is a transparent projection screen that has a cylinder-like body, and serves as a transmissive diffusion screen through which incident light is transmitted to be diffused. The outside displaying display 60*a* is formed using, for example, a transmissive HOE.

For example, the image light 2 emitted by the light source 51 is reflected off the reflective mirror 15 to be incident on a portion of the inner peripheral surface 17. A portion of the image light 2 incident on the portion of the inner peripheral surface 17 enters the outside displaying display 60*a*, and exits from a portion of the outer peripheral surface 18 in the form of diffused light 6*a* (arrows of thick solid lines). In other words, the outside displaying display 60*a* is configured such that light that is incident on a portion of the inner peripheral surface 17 is diffused to exit from a portion of the outer peripheral surface 18. This results in displaying the output image 1 on the outer peripheral surface 18.

Further, another portion of the image light 2 incident on the portion of the inner peripheral surface 17 is reflected off the outside displaying display 60*a*, and exits from the portion of the inner peripheral surface 17 in the form of diffused light 6*b* (arrows of thick dotted lines). The diffused light 6*b* is incident on another portion of the inner peripheral surface 17 that is situated opposite (on the left in the figure) to the portion (on the right in the figure) at which reflection is performed, and is transmitted through the outside displaying display 60*a* to exit from another portion of the outer peripheral surface 18. This makes it possible to view the output image 1 displayed on a portion of the outer peripheral surface 18 from a portion of the inner peripheral surface 17 situated on the rear side of the portion of the outer peripheral surface 18.

Note that the output image 1 displayed on the outer peripheral surface 18 is originally an image to be viewed by the user 5. Thus, for example, the outside displaying display 60*a* is configured such that the brightness of an image displayed on the outer peripheral surface 18 (the intensity of the diffused light 6*a*) is higher than the brightness of the image viewed from the inner peripheral surface 17 (the intensity of the diffused light 6*b*). Further, the output image 1 is formed to be displayed properly when the output image 1 is viewed from the outer peripheral surface 18. Thus, a user who views the output image 1 from the inner peripheral surface 17 watches an image obtained by inverting the output image 1 left to right.

The outside displaying display 60*b* illustrated in B of FIG. 17 is a transparent self-luminous display that has a cylinder-like body. The outside displaying display 60*b* includes a plurality of light-emitting elements (of which an illustration is omitted) emitting the image light 2 for each pixel to display an image. Any image can be displayed by each light-emitting element performing light emission as appropriate.

Each light-emitting element in the outside displaying display 60*b* is configured such that the diffused light 6*a* (arrows of thick solid lines) exits from a portion of the outer peripheral surface 18. This results in displaying the output image 1 on the portion of the outer peripheral surface 18.

Further, each light-emitting element is also configured such that the diffused light 6*b* (arrows of thick dotted lines) exits from a portion of the inner peripheral surface 17. This makes it possible to view the output image 1 displayed on the portion of the outer peripheral surface 18 from another portion of the inner peripheral surface 17 that is situated on the rear side of the portion of the outer peripheral surface 18.

When a self-luminous transparent display (the outside displaying display 60*b*) is used, the configuration in which light exits from two of the surfaces for each pixel is used, as described above. For example, window structures through which the image light 2 is transmitted are respectively provided on sides of the outer peripheral surface 18 and the inner peripheral surface 17 of a light emitter for each pixel. The appropriate setting of the transmittance of the window structure makes it possible to set amounts of the pieces of image light 2 respectively exiting outward and inward.

Note that, in B of FIG. 17, the output image 1 displayed on the outer peripheral surface 18 is originally an image to be viewed by the user 5. Thus, the intensity of the diffused light 6*a* exiting from the outer peripheral surface 18 is set higher than the intensity of the diffused light 6*b* exiting from the inner peripheral surface 17.

For example, a curved display or the like formed using a transparent organic light emitting diode (OLED) or a transparent light emitting diode (LED) may be used as the outside displaying display 60*b*. Further, for example, a transparent micro LED display or the like that includes an LED made smaller in size may be used as the outside displaying display 60*b*. Furthermore, for example, a transparent liquid crystal display (LCD) may be used as the outside displaying display 60*b*. Moreover, a configuration of the outside displaying display 60*b* is not limited.

As described above, the outside displaying display 60 configured such that the output image 1 is displayed on the outer peripheral surface 18 and the output image 1 displayed on the outer peripheral surface 18 is viewed from the inner peripheral surface 17, can be used as the display of the display apparatus. This enables a certain user 5 to also faintly confirm, for example, information regarding another user 5 situated across a display from the certain user 5 (refer to, for example, FIG. 8). This makes it possible to naturally facilitate communication between the users 5.

FIG. 18 schematically illustrates an example of a configuration of a transparent display that has a cylinder-like body, where an image is displayed on the inside of the display. Here, from among the transparent displays each having a cylinder-like body, an inside displaying display 70 of which an inner surface (the inner peripheral surface 17) is a display surface on which an image is displayed, is described.

A of FIG. 18 is a schematic cross-sectional view of a projective inside displaying display 70*a*. B of FIG. 18 is a schematic cross-sectional view of a self-luminous inside displaying display 70*b*.

The inside displaying display 70*a* illustrated in A of FIG. 18 is a transparent projection screen that has a cylinder-like body, and serves as a reflective diffusion screen off which incident light is reflected to be diffused. The inside displaying display 70*a* is formed using, for example, a reflective HOE.

For example, the image light 2 emitted by the light source 51 is reflected off the reflective mirror 15 to be incident on a portion of the inner peripheral surface 17. A portion of the image light 2 incident on the portion of the inner peripheral surface 17 enters the inside displaying display 70*a*, and exits from the portion of the inner peripheral surface 17 in the form of the diffused light 6*b* (arrows of thick solid lines). In other words, the inside displaying display 70*a* is configured such that light that is incident on a portion of the inner peripheral surface 17 is diffused to exit from the portion of the inner peripheral surface 17. The diffused light 6*b* is incident on another portion of the inner peripheral surface 17 that is situated opposite (on the left in the figure) to the portion (on the right in the figure) at which reflection is performed, and is transmitted through the inside displaying display 70*a* to exit from a portion of the outer peripheral surface 18. This results in displaying the output image 1 on the inner peripheral surface 17.

Further, another portion of the image light 2 incident on the portion of the inner peripheral surface 17 is transmitted through the inside displaying display 70*a*, and exits from another portion of the outer peripheral surface 18 in the form of the diffused light 6*a* (arrows of thick dotted lines). This makes it possible to view the output image 1 displayed on a portion of the inner peripheral surface 17 from a portion of the outer peripheral surface 18 situated on the rear side of the portion of the inner peripheral surface 17.

The inside displaying display 70*b* illustrated in B of FIG. 18 is a transparent self-luminous display that has a cylinder-like body. The inside displaying display 70*b* displays any image by causing a plurality of light-emitting elements (of which an illustration is omitted) to perform light emission as appropriate, the plurality of light-emitting elements emitting the image light 2 for each pixel to display an image.

Each light-emitting element in the inside displaying display 70*b* is configured such that the diffused light 6*b* (arrows of thick solid lines) exits from a portion of the inner peripheral surface 17. This results in displaying the output image 1 on another portion of the inner peripheral surface 17.

Further, each light-emitting element is also configured such that the diffused light 6*a* (arrows of thick dotted lines) exits from a portion of the outer peripheral surface 18. This makes it possible to view the output image 1 displayed on the other portion of the inner peripheral surface 17 from the portion of the outer peripheral surface 18 that is situated on the rear side of the other portion of the inner peripheral surface 17.

Note that, contrary to the case of the outside displaying displays 60*a* and 60*b* illustrated in FIG. 17, the output image 1 displayed on the inner peripheral surface 17 is originally an image to be viewed by the user 5 in the case of the inner displaying displays 70*a* and 70*b* illustrated in FIG. 18. Thus, for example, the inner displaying displays 70*a* is configured such that the brightness of an image displayed on the inner peripheral surface 17 (the intensity of the diffused light 6*b*) is higher than the brightness of the image viewed from the outer peripheral surface 18 (the intensity of the diffused light 6*a*). Further, the output image 1 is formed to be displayed properly when the output image 1 is viewed from the inner peripheral surface 17. Thus, a user who views the output image 1 from the outer peripheral surface 18 watches an image obtained by inverting the output image 1 left to right.

For example, a display using, for example, a transparent OLED, a transparent LED, or a transparent micro LED may be used as the inside displaying display 70*b*. Further, for example, a transparent LCD may be used as the inside displaying display 70*b*. The intensity of the diffused light 6*b* exiting from the inner peripheral surface 17 is set higher than the intensity of the diffused light 6*a* exiting from the outer peripheral surface 18 in the display described above. Accordingly, the inner displaying display 70*b* can be formed.

As described above, the inside displaying display 70 configured such that the output image 1 is displayed on the inner peripheral surface 17 and the output image 1 displayed on the inner peripheral surface 17 is viewed from the outer peripheral surface 18, can be used as the display of the display apparatus.

In the inside displaying display 70, information (an individual screen) that corresponds to a certain user 5 is displayed on a surface in back (the inner peripheral surface 17), not on a surface in front (the outer peripheral surface 18), as viewed from the certain user 5. Thus, the user 5 views, for example, a video displayed on the inside of the display having a cylinder-like body through a portion of the display that is situated in front. Thus, for example, it looks like a video is floating, compared to when the video is displayed on the outer peripheral surface 18 situated in front.

As described above, the use of the inside displaying display 70 enables video representation that brings a feeling of floating. This makes it possible to provide entertainment of a high quality. Such a configuration in which a video is displayed on the inside is also useful when, for example, a user views a video privately.

Of course, a talk assistance or the like can be performed using the display apparatus including the inside displaying display 70. In this case, for example, information regarding a certain user 5 situated across the display from another user 5 is faintly displayed on a portion of the outer peripheral surface 18 that is situated in front, as viewed from the other user 5. Thus, the other user 5 can watch not only the individual screen 3 for the other user 5, but also the information regarding the certain user 5 that is displayed in front. This makes it possible to naturally facilitate communication between the users 5.

The configuration of the transparent display having a cylinder-like body and making it possible to watch an output image from the outside (the outer peripheral surface) and from the inside (the inner peripheral surface), has been described above. Without being limited thereto, the display of the display apparatus may be configured such that an image is displayed only on the outside of the display and is not visible from the inside of the display. Alternatively, the display of the display apparatus may be configured such that an image is displayed only on the inside of the display and is not visible from the outside of the display.

As described above, an image can be displayed only on one of the surfaces of the display having a cylinder-like body. This results in information regarding a certain user being invisible to another user situated across the apparatus from the certain user 5. This makes it possible to display, for example, highly confidential information or private information, and thus to provide a greater variety of display contents.

The example in which a transparent display is used has been primarily described above. Without being limited thereto, an opaque display through which visible light is not transmitted may be used as the display of the display apparatus. In this case, the display is configured such that an output image is displayed on the outer peripheral surface of the display, that is, such that an output image is displayed outward.

For example, when an image is projected using a projector (an image projection section), a cylindrical screen or the like that is made of an opaque material is used as the display of the display apparatus. Examples of the opaque screen include a transmissive diffusion screen made of, for example, a white material.

Further, a self-luminous opaque display may be used as the display of the display apparatus. In this case, for example, an LCD having no light transmissive properties, or an OLED display or an LED display having no light transmissive properties may be used.

Even when an opaque display is used, as described above, necessary information can be presented to each user by displaying, for example, an individual screen in a direction of the user.

Further, when an opaque display is used, an output image in which information presented on a portion of the outer peripheral surface that is situated in back as viewed from a user, looks as if the information was seen through the display as viewed from the user, may be generated.

For example, an individual screen for each user is generated, and an image in which the generated individual screens are respectively arranged in directions of the respective users, is generated. Display contents (for example, an individual screen for a user situated on the opposite side) that are shifted by 180 degrees and inverted left to right on the screen, are superimposed on the image in which the respective individual screens are arranged. Consequently, an output image is generated. Thus, an output image is an image in which display contents situated on the rear side are displayed as if the display contents were seen through the opaque display.

Even when an opaque display is used, as described above, display is performed such that display performed on the lateral side and display performed on the opposite side can be viewed from the front by display being performed as if the opaque display was transparent. This enables a certain user to intuitively grasp, for example, a state of speech of another user. This makes it possible to naturally facilitate communication between the users.

FIG. 19 schematically illustrates examples of configurations of displays according to other embodiments.

The configuration in which a cylindrical display (a cylindrical screen) is used as the display of the display apparatus, has been described above. The shape of the display is not limited, and a prismatic display may be used.

A of FIG. 19 schematically illustrates a hexagonal-prism display 16*a*, and B of FIG. 19 schematically illustrates an octagonal-prism display 16*b*. These displays 16*a* and 16*b* may be projective screens or may be formed of self-luminous displays.

Even when a polygonal-prism display is used, as described above, an individual screen or the like is displayed in a direction of each user. Note that the individual screen may be displayed consecutively on faces of the polygonal prism, or a position, a width, and the like of the screen may be adjusted such that the screen is fitted in each face of the polygonal prism. Further, when, for example, the number of users is larger than the number of faces of a polygonal prism, a plurality of individual screens can be displayed on a single face.

The viewing angle characteristics of a display (the screen 16) have been described above with reference to, for example, FIG. 7. The viewing angle of a display can be adjusted. In this case, the display section includes an adjustment element that adjusts the viewing angle of a display.

A filter element that controls the viewing angle using, for example, a liquid crystal shutter is used as the adjustment element. The viewing angle is dynamically adjusted by providing such an element to the entirety of the surface of the display. The viewing angle may be continuously adjusted, or may be adjusted by performing switch control to switch between a narrow viewing angle and a wide viewing angle.

When, for example, an OLED display that is less dependent on the viewing angle (of which the viewing angle is wide) is used, information regarding, for example, a state of speech of a certain user may be clearly watched by, for example, another user situated next to the certain user. In such a case, the use of the adjustment element described above makes it possible to narrow the viewing angle such that the information regarding the certain user becomes less visible to the other user.

The example in which the direction information indicating a direction of each user is calculated on the basis of output performed by a motion sensor (such as a camera sensor) has been described above. The direction information does not necessarily have to indicate a direction in which an actual location of a user is reflected.

For example, default direction information that is set in advance may be used. For example, a direction depending on, for example, the number of participants in a meeting or a seating location may be set as the direction information in advance. As an example, the direction is set for every 60 degrees when the direction information corresponds to a meeting in which the seating locations are equally spaced and the number of participants is six. In this case, information corresponding to each user can be displayed in front of the user by setting, for example, an origin of a default direction as appropriate. Further, when the above-described polygonal-prism display or the like is used, the direction information adjusted to a face of the display may be set.

Furthermore, for example, a direction that corresponds to each user may be manually set before, for example, a meeting is started. In other words, a manually input direction may be used as the direction information.

Note that, when the default direction information or the manually input direction information is used, a motion sensor does not necessarily have to be provided.

The example in which one individual screen is displayed for one user has been described above. For example, an individual screen may be displayed for each group of at least two users. For example, when the two groups are situated across a desk from each other, two individual screens respectively corresponding to the two groups are generated to be displayed in opposite directions. When an individual screen is used for each group, as described above, this makes it possible to easily perform handling even when there are a large number of participants.

Further, information regarding a user who is actually not surrounding a display may be displayed on the display. In this case, the direction information includes a virtual direction of the user who is not surrounding the display.

It is assumed that the display apparatus is used when, for example, a user who works from home has a remote meeting. In this case, an individual screen regarding the user is displayed on a front surface of the display, as viewed from the user. Further, an individual screen for another user who participates in the remote meeting is displayed in another direction set for the display. Note that the other user is not in a space in which the display apparatus is used.

Even when a counterpart user is remotely participating in a talk, as described above, information regarding, for example, a state of speech of each user can be grasped in association with a spatial direction by displaying an individual screen for the user in a direction that is set in advance. This makes it possible to intuitively perceive pieces of information regarding respective users, compared to when, for example, the pieces of information regarding the respective users are displayed in a matrix on a planar display. This enables a user to also naturally confirm information regarding another user when the other user is not in front of the user in, for example, a remote meeting. This makes it possible to sufficiently assist communication.

The example in which the display method according to the present technology is performed by the controller included in the display apparatus has been described above. However, the display method and a program according to the present technology may be executed by another computer that can communicate with the controller through, for example, a network.

In other words, the display method and the program according to the present technology can be executed not only in a computer system that includes a single computer, but also in a computer system in which a plurality of computers operates cooperatively. Note that, in the present disclosure, the system refers to a set of components (such as apparatuses and modules (parts)) and it does not matter whether all of the components are in a single housing. Thus, a plurality of apparatuses accommodated in separate housings and connected to each other through a network, and a single apparatus in which a plurality of modules is accommodated in a single housing are both the system.

The execution of the display method and the program according to the present technology by the computer system includes, for example, both the case in which the acquisition of pieces of information regarding directions of a plurality of users, the generation of an output image, and the like are executed by a single computer; and the case in which the respective processes are executed by different computers. Further, the execution of the respective processes by a specified computer includes causing another computer to execute a portion of or all of the processes and acquiring a result of it.

In other words, the information processing method and the program according to the present technology can also be applied to a configuration of cloud computing in which a single function is shared and cooperatively processed by a plurality of apparatuses through a network.

At least two of the features of the present technology described above can also be combined. In other words, the various features described in the respective embodiments may be combined discretionarily regardless of the embodiments. Further, the various effects described above are not limitative but are merely illustrative, and other effects may be provided.

In the present disclosure, expressions such as "same/identical", "equal", and "orthogonal(ly)" include, in concept, expressions such as "substantially the same/substantially identical", "substantially equal", and "substantially orthogonal(ly)". For example, the expressions such as "same/identical", "equal", and "orthogonal(ly)" also include states within specified ranges (such as a range of +/−10%), with expressions such as "exactly the same/exactly identical", "exactly equal", and "completely orthogonal(ly)" being used as references.

Note that the present technology may also take the following configurations.

(1) A display apparatus, including:
- a display section that includes a display that has a cylinder-like body and on which an output image is displayed;
- an acquisition section that acquires pieces of direction information that respectively indicate directions of respective users of a plurality of users as viewed from the display; and
- an image generator that generates the output image on the basis of the pieces of direction information such that pieces of information that respectively correspond to the users of the plurality of users are presented in the respective directions of the users of the plurality of users.

(2) The display apparatus according to (1), in which the display is a transparent display through which visible light is transmitted.

(3) The display apparatus according to (2), in which
- the display includes an inner peripheral surface and an outer peripheral surface, and
- the display is configured such that the output image is displayed on the outer peripheral surface and such that the output image displayed on the outer peripheral surface is visible from the inner peripheral surface.

(4) The display apparatus according to (2), in which
- the display includes an inner peripheral surface and an outer peripheral surface, and
- the display is configured such that the output image is displayed on the inner peripheral surface and such that the output image displayed on the inner peripheral surface is visible from the outer peripheral surface.

(5) The display apparatus according to (1), in which
- the display is an opaque display through which visible light is not transmitted.

(6) The display apparatus according to (5), in which
- the display includes an inner peripheral surface and an outer peripheral surface,
- the output image is displayed on the outer peripheral surface, and
- the image generator generates the output image in which information presented on a portion of the outer peripheral surface that is situated in back as viewed from the user, looks as if the information was seen through the display as viewed from the user.

(7) The display apparatus according to any one of (1) to (6), in which
- the display section includes a projection section that projects image light that makes up the output image,
- the display is a diffusion screen that diffuses the projected image light, and
- the image generator arranges information displayable at a lower resolution in a region, on the display, to which a projection distance of the image light is larger.

(8) The display apparatus according to any one of (1) to (7), further including
- a motion sensor that detects a user who is watching the display, in which
- the acquisition section generates the direction information on the basis of a result of the detection performed by the motion sensor.

(9) The display apparatus according to any one of (1) to (8), in which
- a viewing angle of the display is set such that at least a portion of information presented on a lateral side of the display as viewed from the user, is visible to the user with a specified brightness.

(10) The display apparatus according to any one of (1) to (9), in which
- on the basis of at least one of the number of the users, a viewing angle of the display, a width of the display, or a watching distance of the user to the display, the image generator sets a direction range in which information that corresponds to the user is presented.

(11) The display apparatus according to any one of (1) to (10), in which
- the display section includes an adjustment element that adjusts a viewing angle of the display.

(12) The display apparatus according to any one of (1) to (11), in which
- the output image includes an interface screen on which information regarding a talk that the plurality of users is having is presented.

(13) The display apparatus according to any one of (1) to (12), in which
- the image generator
- generates an individual screen on which information that corresponds to each of the plurality of users is presented, and
- generates the output image in which the individual screens are arranged in the respective directions of the users of the plurality of users.

(14) The display apparatus according to (13), in which
- the image generator presents the individual screen of a first user in a direction of a second user, the direction of the second user being different from a direction of the first user.

(15) The display apparatus according to (13) or (14), in which
- the individual screen includes an icon that represents at least one of an amount of speech of a corresponding one of the plurality of users, a time of the speech, a pattern of the speech, or contents of the speech.

(16) The display apparatus according to any one of (1) to (15), in which
- the image generator
- generates a shared image that represents information to be shared by the plurality of users, and
- displays the shared image such that the shared image is moved circumferentially along the display.

(17) The display apparatus according to any one of (1) to (16), in which
- the image generator color-codes pieces of information that respectively correspond to the users of the plurality of users to display the color-coded pieces of information.

(18) The display apparatus according to any one of (1) to (17), in which
- the display is a cylindrical display or a prismatic display.

(19) The display apparatus according to any one of (1) to (18), further including:
- a housing section that is connected to an end edge of the display; and
- a lateral surface display that is provided to a lateral surface of the housing section, in which
- the image generator generates an image in conformity with the output image displayed on the display, the generated image being displayed on the lateral surface display.

(20) A display method that is performed by a computer system, the display method including:
- acquiring pieces of direction information that respectively indicate directions of respective users of a plurality of users as viewed from a display that has a cylinder-like body and on which an output image is displayed; and generating the output image on the basis of the pieces of direction information such that pieces of information that respectively correspond to the users of the plurality of users are presented in the respective directions of the users of the plurality of users.

(21) A program that causes a computer system to perform a process including:

acquiring pieces of direction information that respectively indicate directions of respective users of a plurality of users as viewed from a display that has a cylinder-like body and on which an output image is displayed; and generating the output image on the basis of the pieces of direction information such that pieces of information that respectively correspond to the users of the plurality of users are presented in the respective directions of the users of the plurality of users.

REFERENCE SIGNS LIST 1 output image
2 image light
3, 3a to 3d, 3h to 3n individual screen
5, 5a to 5n user
11 display section
12 camera section
13 microphone section
14 image projection section
reflective mirror
16 screen
17 inner peripheral surface
18 outer peripheral surface
21 storage
22 control program
30 controller
31 human detection processing section
32 user information calculator
33 output image generator
35 graph object
40 shared object
100 display apparatus

What is claimed is:

1. A display apparatus, comprising:
a display section that includes a display that has a cylinder-like body and on which an output image is displayed, wherein the display is a transparent display through which visible light is transmitted, wherein the display includes an inner peripheral surface and an outer peripheral surface, wherein the display is configured such that a first output image is displayed on the outer peripheral surface in an area of a first individual screen, wherein the first output image displayed on the outer peripheral surface in the area of the first individual screen is visible within an area of a second individual screen by viewing the inner peripheral surface from a rear side of the outer peripheral surface in the area of the second individual screen;
an acquisition section that acquires pieces of direction information that respectively indicate directions of respective users of a plurality of users as viewed from the display; and
an image generator that generates the output image on a basis of the pieces of direction information such that pieces of information that respectively correspond to the users of the plurality of users are presented in the respective directions of the users of the plurality of users.

2. The display apparatus according to claim 1, wherein
the display section includes a projection section that projects image light that makes up the output image,
the display is a diffusion screen that diffuses the projected image light, and
the image generator arranges information displayable at a lower resolution in a region, on the display, to which a projection distance of the image light is larger.

3. The display apparatus according to claim 1, further comprising
a motion sensor that detects a user who is watching the display, wherein
the acquisition section generates the direction information on a basis of a result of the detection performed by the motion sensor.

4. The display apparatus according to claim 1, wherein a viewing angle of the display is set such that at least a portion of information presented on a lateral side of the display as viewed from the user, is visible to the user with a specified brightness.

5. The display apparatus according to claim 1, wherein on a basis of at least one of a number of the users, a viewing angle of the display, a width of the display, or a watching distance of the user to the display, the image generator sets a direction range in which information that corresponds to the user is presented.

6. The display apparatus according to claim 1, wherein the display section includes an adjustment element that adjusts a viewing angle of the display.

7. The display apparatus according to claim 1, wherein the output image includes an interface screen on which information regarding a talk that the plurality of users is having is presented.

8. The display apparatus according to claim 1, wherein the image generator
generates an individual screen on which information that corresponds to each of the plurality of users is presented, and
generates the output image in which the individual screens are arranged in the respective directions of the users of the plurality of users.

9. The display apparatus according to claim 8, wherein the image generator presents the individual screen of a first user in a direction of a second user, the direction of the second user being different from a direction of the first user.

10. The display apparatus according to claim 8, wherein the individual screen includes an icon that represents at least one of an amount of speech of a corresponding one of the plurality of users, a time of the speech, a pattern of the speech, or contents of the speech.

11. The display apparatus according to claim 1, wherein the image generator
generates a shared image that represents information to be shared by the plurality of users, and
displays the shared image such that the shared image is moved circumferentially along the display.

12. The display apparatus according to claim 1, wherein the image generator color-codes pieces of information that respectively correspond to the users of the plurality of users to display the color-coded pieces of information.

13. The display apparatus according to claim 1, wherein the display is a cylindrical display or a prismatic display.

14. The display apparatus according to claim 1, further comprising:
- a housing section that is connected to an end edge of the display; and
- a lateral surface display that is provided to a lateral surface of the housing section, wherein
- the image generator generates an image in conformity with the output image displayed on the display, the generated image being displayed on the lateral surface display.

15. A display method that is performed by a computer system, the display method comprising:
- acquiring pieces of direction information that respectively indicate directions of respective users of a plurality of users as viewed from a display that has a cylinder-like body and on which an output image is displayed; and
- generating the output image on a basis of the pieces of direction information such that pieces of information that respectively correspond to the users of the plurality of users are presented in the respective directions of the users of the plurality of users, wherein the display is a transparent display through which visible light is transmitted, wherein the display includes an inner peripheral surface and an outer peripheral surface, wherein the display is configured such that a first output image is displayed on the outer peripheral surface in an area of a first individual screen by a first use of the plurality of users, wherein the first output image displayed on the outer peripheral surface in the area of the first individual screen is visible within an area of a second individual screen by by a second user of the plurality of users by viewing the inner peripheral surface from a rear side of the outer peripheral surface in the area of the second individual screen.

16. A program that causes a computer system to perform a process comprising:
- acquiring pieces of direction information that respectively indicate directions of respective users of a plurality of users as viewed from a display that has a cylinder-like body and on which an output image is displayed; and
- generating the output image on a basis of the pieces of direction information such that pieces of information that respectively correspond to the users of the plurality of users are presented in the respective directions of the users of the plurality of users, wherein the display is a transparent display through which visible light is transmitted, wherein the display includes an inner peripheral surface and an outer peripheral surface, wherein the display is configured such that a first output image is displayed on the outer peripheral surface in an area of a first individual screen, wherein the first output image displayed on the outer peripheral surface in the area of the first individual screen is visible within an area of a second individual screen by viewing the inner peripheral surface from a rear side of the outer peripheral surface in the area of the second individual screen.

* * * * *